US012722373B2

(12) United States Patent
Takabe et al.

(10) Patent No.: US 12,722,373 B2
(45) **Date of Patent: *Sep. 1, 2026**

(54) LIQUID EJECTING HEAD AND LIQUID EJECTING APPARATUS

(71) Applicant: SEIKO EPSON CORPORATION, Tokyo (JP)

(72) Inventors: Motoki Takabe, Shiojiri (JP); Harunobu Koike, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 250 days.

This patent is subject to a terminal disclaimer.

(21) Appl. No.: 18/512,464

(22) Filed: Nov. 17, 2023

(65) Prior Publication Data

US 2024/0165947 A1 May 23, 2024

(30) Foreign Application Priority Data

Nov. 18, 2022 (JP) ................................ 2022-184624

(51) Int. Cl.
*B41J 2/14* (2006.01)
*B41J 2/045* (2006.01)

(52) U.S. Cl.
CPC ....... *B41J 2/14233* (2013.01); *B41J 2/14274* (2013.01); *B41J 2/04566* (2013.01); (Continued)

(58) Field of Classification Search
CPC ................ B41J 2/14233; B41J 2/14274; B41J 2/04566; B41J 2002/14241; B41J 2002/14266; B41J 2002/14491
See application file for complete search history.

(56) References Cited

U.S. PATENT DOCUMENTS 7,588,307 B2 9/2009 Hong et al.
12,427,770 B2 * 9/2025 Takabe .................... B41J 2/161
(Continued)

FOREIGN PATENT DOCUMENTS

EP 1101615 A1 5/2001
JP 2010-208136 A 9/2010
JP 2015-033834 A 2/2015

OTHER PUBLICATIONS

T. Sakakibara, et al., "Development of high-voltage photovoltaic u micro-devices for an energy supply to micromachines," 1994 5th International Symposium on Micro Machine and Human Science Proceedings, Nagoya, Japan, 1994, pp. 71-76 (Year: 2025).

*Primary Examiner* — Geoffrey S Mruk
(74) *Attorney, Agent, or Firm* — Harness, Dickey & Pierce, P.L.C.

(57) ABSTRACT

A liquid ejecting head includes: a piezoelectric element that includes a first drive electrode, a piezoelectric body, and a second drive electrode in a lamination direction; a vibration plate that is provided on one side of the lamination direction with respect to the piezoelectric element and is deformed by driving of the piezoelectric element; a pressure chamber substrate that is provided on the one side of the lamination direction with respect to the vibration plate and is provided with a plurality of pressure chambers; an interlayer that is laminated on at least one of the piezoelectric body, the vibration plate, or the pressure chamber substrate and of which resistance changes according to humidity; a first detection electrode that is in contact with the interlayer; and a second detection electrode that is in contact with the interlayer and faces the first detection electrode.

18 Claims, 20 Drawing Sheets

(52) U.S. Cl.
CPC ................. *B41J 2002/14241* (2013.01); *B41J 2002/14266* (2013.01); *B41J 2002/14491* (2013.01)

(56) References Cited

U.S. PATENT DOCUMENTS

| | | | | |
|---|---|---|---|---|
| 2018/0264807 | A1 | 9/2018 | Ito et al. | |
| 2019/0077151 | A1 | 3/2019 | Hirai et al. | |
| 2024/0165950 | A1* | 5/2024 | Hirai .................... | H10N 30/704 |

* cited by examiner

LIQUID EJECTING HEAD AND LIQUID EJECTING APPARATUS

The present application is based on, and claims priority from JP Application Serial Number 2022-184624, filed Nov. 18, 2022, the disclosure of which is hereby incorporated by reference herein in its entirety.

BACKGROUND

1. Technical Field

The present disclosure relates to a liquid ejecting head and a liquid ejecting apparatus.

2. Related Art

There is known a liquid ejecting head including a pressure chamber plate provided with pressure chambers, a vibration plate for generating a pressure in the pressure chamber, and a piezoelectric actuator including a piezoelectric element provided on the vibration plate. For example, JP-A-2015-33834 discloses that a piezoelectric actuator is covered with a case portion and a humidity sensor is provided in a space inside the case portion. JP-A-2015-33834 is an example of the related art.

Performance of the piezoelectric actuator or a member in the vicinity of the piezoelectric actuator may be deteriorated because of an influence of humidity. The technique in the related art does not propose, for example, a specific structure for adopting a humidity sensor, such as a structure of the humidity sensor itself, a disposition position of the humidity sensor with respect to the piezoelectric actuator and the member in the vicinity of the piezoelectric actuator, and the like. As a result, in the technique in the related art, there is a possibility that information on humidity in the piezoelectric actuator or the member in the vicinity of the piezoelectric actuator cannot be appropriately acquired.

SUMMARY

According to an aspect of the present disclosure, a liquid ejecting head is provided. A liquid ejecting head includes: a piezoelectric element that includes a first drive electrode, a second drive electrode, and a piezoelectric body, the piezoelectric body being provided between the first drive electrode and the second drive electrode in a lamination direction in which the first drive electrode, the second drive electrode, and the piezoelectric body are laminated; a vibration plate that is provided on one side of the lamination direction with respect to the piezoelectric element and is deformed by driving of the piezoelectric element; a pressure chamber substrate that is provided on the one side of the lamination direction with respect to the vibration plate and is provided with a plurality of pressure chambers; an interlayer that is laminated on at least one of the piezoelectric body, the vibration plate, or the pressure chamber substrate and of which resistance changes according to humidity; a first detection electrode that is in contact with the interlayer; and a second detection electrode that is in contact with the interlayer and faces the first detection electrode.

DESCRIPTION OF EMBODIMENTS

A1. First Embodiment

Figure 1:
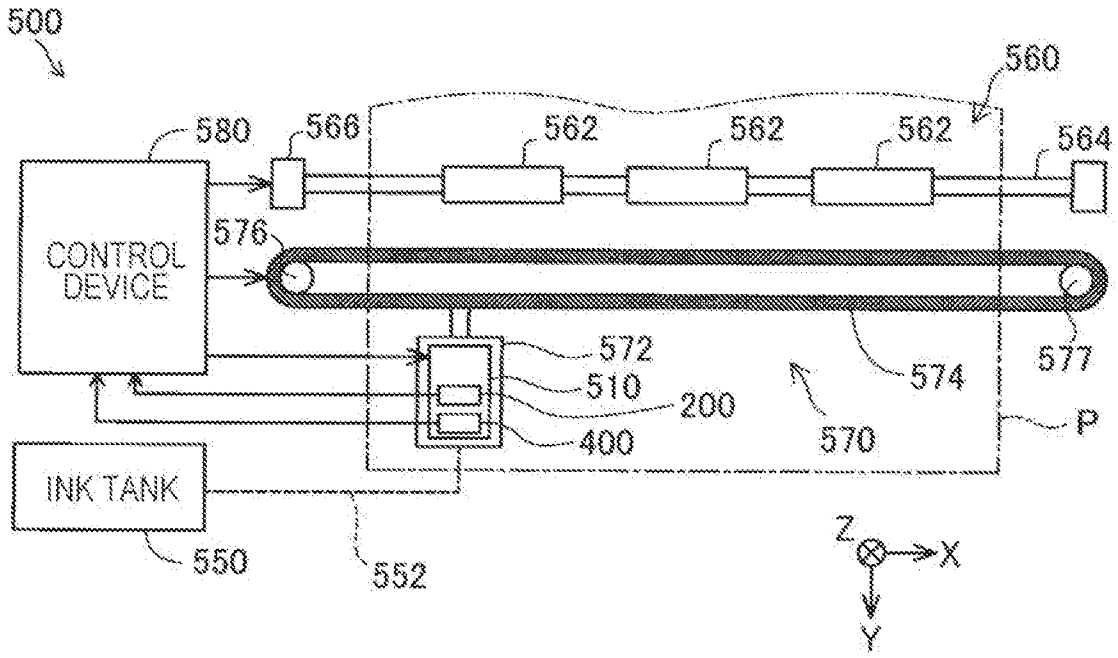
FIG. 1 is an explanatory diagram illustrating a schematic configuration of a liquid ejecting apparatus according to a first embodiment.

FIG. 1 is an explanatory diagram illustrating a schematic configuration of a liquid ejecting apparatus 500 as a first embodiment of the present disclosure. In the present embodiment, the liquid ejecting apparatus 500 is an ink jet printer that forms an image by ejecting ink as an example of a liquid onto printing paper P. The liquid ejecting apparatus 500 may use any kind of medium, such as a resin film or a cloth, as a target on which ink is to be ejected, instead of the printing paper P. X, Y, and Z illustrated in FIG. 1 and each of the drawings subsequent to FIG. 1 represent three spatial axes orthogonal to each other. In the present specification, directions along the axes are also referred to as an X-axis direction, a Y-axis direction, and a Z-axis direction. When specifying the direction, a positive direction is "+" and a negative direction is "−" so that positive and negative signs are used together in the direction notation, and description will be given when a direction to which an arrow faces in each of the drawings is the + direction and an opposite direction thereof is the − direction. In the present embodiment, the Z-axis direction coincides with a vertical direction, the +Z direction indicates vertically downward, and the −Z direction indicates vertically upward. Further, when the positive direction and the negative direction are not limited, the three X, Y, and Z will be described as the X-axis, the Y-axis, and the Z-axis.

The liquid ejecting apparatus 500 includes a liquid ejecting head 510, an ink tank 550, a transport mechanism 560, a moving mechanism 570, and a control device 580. The liquid ejecting head 510 is configured with a plurality of nozzles, ejects inks of a total of four colors, for example, black, cyan, magenta, and yellow in the +Z direction to form an image on a printing paper P. The liquid ejecting head 510 is mounted on a carriage 572 and reciprocates in main scanning directions with the movement of the carriage 572. In the present embodiment, the main scanning directions are the +X direction and the −X direction. The liquid ejecting head 510 may further eject ink of a random color such as light cyan, light magenta, or white, and transparent ink in addition to the four colors.

The ink tank 550 accommodates the ink to be ejected to the liquid ejecting head 510. The ink tank 550 is coupled to the liquid ejecting head 510 by a resin tube 552. The ink in the ink tank 550 is supplied to the liquid ejecting head 510 via the tube 552. Instead of the ink tank 550, a bag-shaped liquid pack formed of a flexible film may be provided.

The transport mechanism 560 transports the printing paper P in a sub-scanning direction. The sub-scanning direction is a direction that intersects with the X-axis direction, which is a main scanning direction, and is the +Y direction and the −Y direction in the present embodiment. The transport mechanism 560 includes a transport rod 564, on which three transport rollers 562 are mounted, and a transport motor 566 for rotatably driving the transport rod 564. When the transport motor 566 rotatably drives the transport rod 564, the printing paper P is transported in the +Y direction, which is the sub-scanning direction. The number of the transport rollers 562 is not limited to three and may be a random number. Further, a configuration in which a plurality of transport mechanisms 560 are provided may be provided.

The moving mechanism 570 includes a carriage 572, a transport belt 574, a moving motor 576, and a pulley 577. The carriage 572 mounts the liquid ejecting head 510 in a state where the ink can be ejected. The carriage 572 is fixed to the transport belt 574. The transport belt 574 is bridged between the moving motor 576 and the pulley 577. When the moving motor 576 is rotatably driven, the transport belt 574 reciprocates in the main scanning direction. Thereby, the carriage 572 fixed to the transport belt 574 also reciprocates in the main scanning direction.

Figure 2:
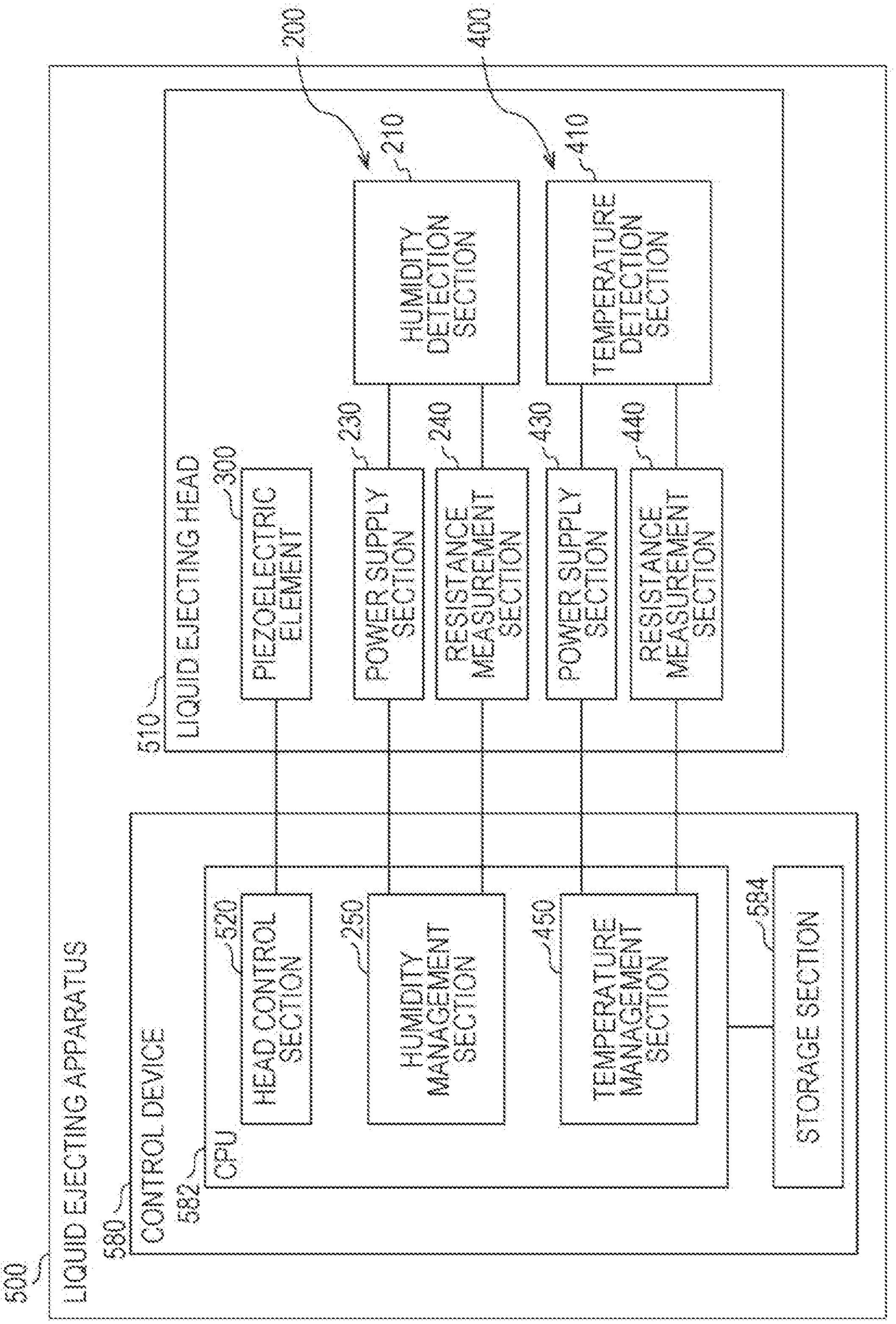
FIG. 2 is a block diagram illustrating a functional configuration of the liquid ejecting apparatus.

FIG. 2 is a block diagram illustrating a functional configuration of the liquid ejecting apparatus 500. In FIG. 2, a partial configuration of the liquid ejecting apparatus 500 such as the ink tank 550, the transport mechanism 560, and the moving mechanism 570 is omitted. As illustrated in FIG. 2, the liquid ejecting head 510 includes a piezoelectric element 300, a humidity detection mechanism 200, and a temperature detection mechanism 400.

The piezoelectric element 300 causes a pressure change in the ink in the pressure chamber of the liquid ejecting head 510. The humidity detection mechanism 200 functions as a so-called electric humidity sensor, and acquires information on humidity in a member included in the liquid ejecting head 510, such as the piezoelectric element 300, or a member on the periphery of the humidity detection mechanism 200. "Information on humidity" includes, for example, an amount of moisture absorbed or dehumidified from a member, an amount of moisture contained in the air, a degree of an influence on performance of a member because of moisture absorption or dehumidification, and information used to obtain such information, such as a resistance value or a capacitance value. The "degree of an influence on performance of a member" may include the presence or absence of a failure of the member, a temporal change in the performance of the member, and the like.

As illustrated in FIG. 2, the humidity detection mechanism 200 includes a humidity detection section 210, a humidity-detection power supply section 230, and a humidity-detection resistance measurement section 240. In the present embodiment, the humidity detection section 210 is configured with a resistance-detection-type humidity sensor, and uses a property that conductivity of a measurement target changes with moisture absorption. The humidity-detection power supply section 230 is, for example, a constant current circuit, and causes a predetermined current to flow through the humidity detection section 210 under a control of a humidity management section 250. The humidity-detection resistance measurement section 240 detects a resistance value of the humidity detection section 210 based on a current value of a current flowing through the humidity detection section 210 by the humidity-detection power supply section 230 and a voltage value of a voltage generated in the humidity detection section 210. A detection result by the humidity-detection resistance measurement section 240 is output to the humidity management section 250. The humidity-detection power supply section 230 may be a circuit that applies a predetermined voltage to the humidity detection section 210. The humidity-detection power supply section 230 and the humidity-detection resistance measurement section 240 may be provided in the control device 580.

The temperature detection mechanism 400 functions as a temperature sensor that detects a temperature of the ink in a pressure chamber to be described later. Specifically, the temperature detection mechanism 400 detects a temperature of a resistance wiring by using a characteristic that a resistance value of a resistance wiring of a metal, a semiconductor, or the like changes depending on a temperature, and estimates the detected temperature of the resistance wiring as a temperature of the ink in the pressure chamber.

The temperature detection mechanism 400 includes a temperature detection section 410, a temperature-detection power supply section 430, and a temperature-detection resistance measurement section 440. The temperature detection section 410 is configured with a conductor wiring including a resistor for temperature detection. The temperature-detection power supply section 430 is, for example, a constant current circuit, and causes a predetermined current to flow through the temperature detection section 410 under a control of a temperature management section 450. The temperature-detection resistance measurement section 440 acquires a resistance value of a temperature detection resistor of the temperature detection section 410 based on a current value of a current flowing through the temperature detection section 410 by the temperature-detection power supply section 430 and a voltage value of a voltage generated in the temperature detection section 410. A detection result by the temperature-detection resistance measurement section 440 is output to the temperature management section 450.

As illustrated in FIG. 2, the control device 580 is configured as a microcomputer including a CPU 582 and a storage section 584. The control device 580 is mounted on, for example, a wiring substrate 120 or a circuit substrate directly or indirectly coupled to the wiring substrate 120. As the storage section 584, for example, a non-volatile memory such as EEPROM in which data can be erased by an electrical signal, a non-volatile memory such as One-Time-PROM or EPROM in which data can be erased by ultraviolet rays, a non-volatile memory such as PROM in which data cannot be erased, and the like can be used. The storage section 584 stores various programs for realizing functions provided in the present embodiment. The CPU 582 functions as a head control section 520, a humidity management section 250, and a temperature management section 450 by developing and executing a program stored in the storage section 584. The control device 580 may further include a communication section for transmitting and receiving a humidity detection result or a temperature detection result to and from a predetermined server.

The head control section 520 collectively performs a control of each section of the liquid ejecting head 510, such as an ejecting operation. The head control section 520 may control, for example, a reciprocating operation of the carriage 572 along the main scanning direction, and a transport operation of the printing paper P along the sub-scanning direction, in addition to the control of the liquid ejecting head 510. As an ejecting operation of the liquid ejecting head 510, the head control section 520 can control ejection of the ink onto the printing paper P by, for example, outputting a drive signal to the liquid ejecting head 510 to drive the piezoelectric element 300, the drive signal being a signal based on the temperature of the ink in the pressure chamber that is acquired from the temperature management section 450.

The humidity management section 250 derives information on humidity as a detection target by using the resistance value of the humidity detection section 210 that is acquired from the humidity-detection resistance measurement section 240 and a humidity calculation equation stored in the storage section 584 in advance. The humidity calculation equation indicates a correspondence relationship between the resistance value of the detection target and the humidity. Instead of the humidity calculation equation, a conversion table indicating a correspondence relationship between the resistance value of the detection target and the humidity may be used. Further, the storage section 584 may store a correspondence relationship between the resistance value of the detection target and the temporal change in the performance of the detection target.

The temperature management section 450 derives the temperature of the ink in the pressure chamber 12 by using the resistance value of the temperature detection resistor of the temperature detection section 410 that is acquired from the temperature-detection resistance measurement section 440 and a temperature calculation equation stored in the storage section 584 in advance. The temperature calculation equation indicates a correspondence relationship between the resistance value of the temperature detection resistor and the temperature. Instead of the temperature calculation equation, a conversion table indicating a correspondence relationship between the resistance value of the temperature detection resistor and the temperature may be used. The temperature management section 450 outputs the derived temperature of the ink in the pressure chamber 12 to the head control section 520.

Figure 3:
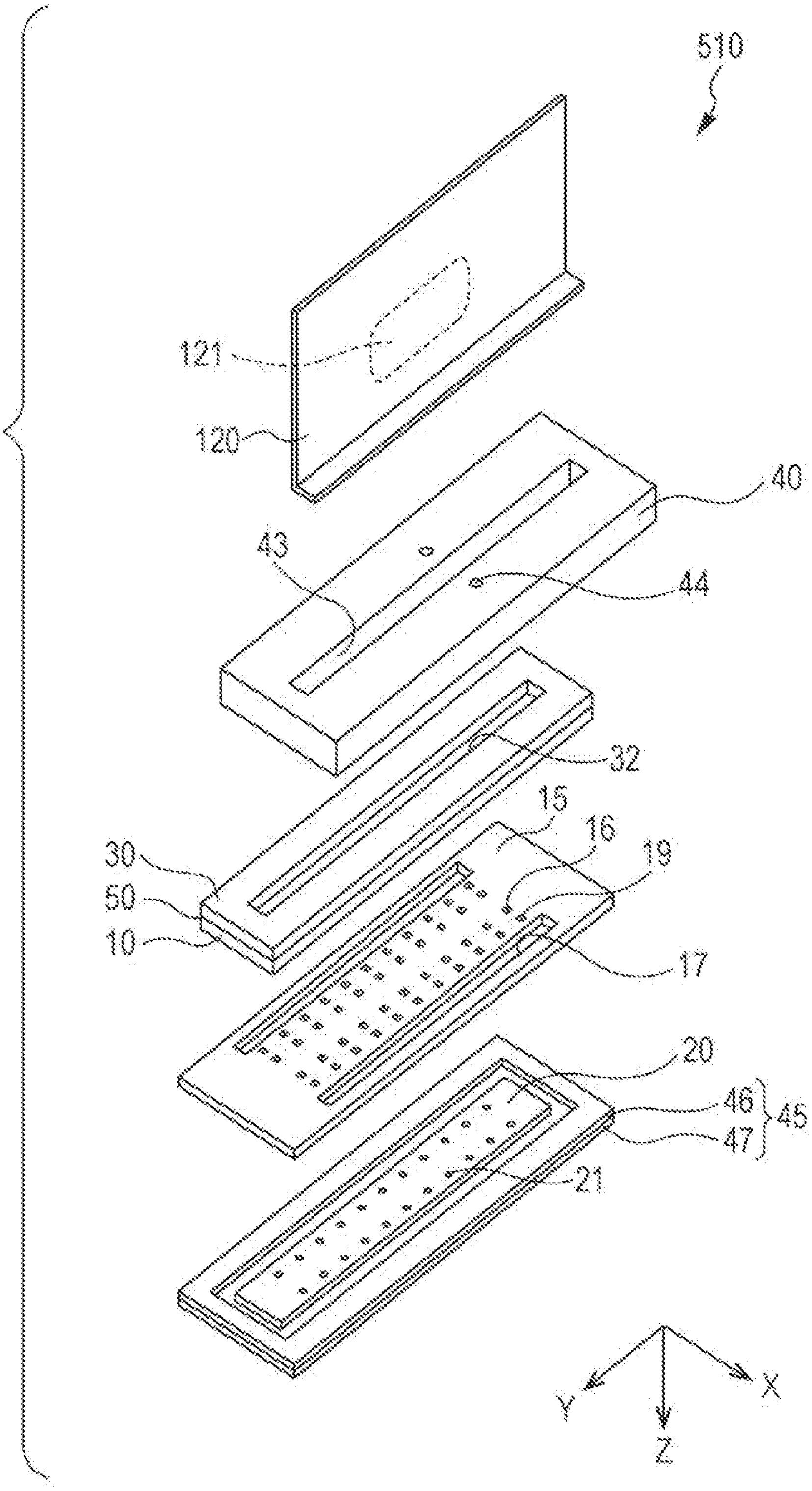
FIG. 3 is an exploded perspective view illustrating a configuration of a liquid ejecting head.
Figure 4:
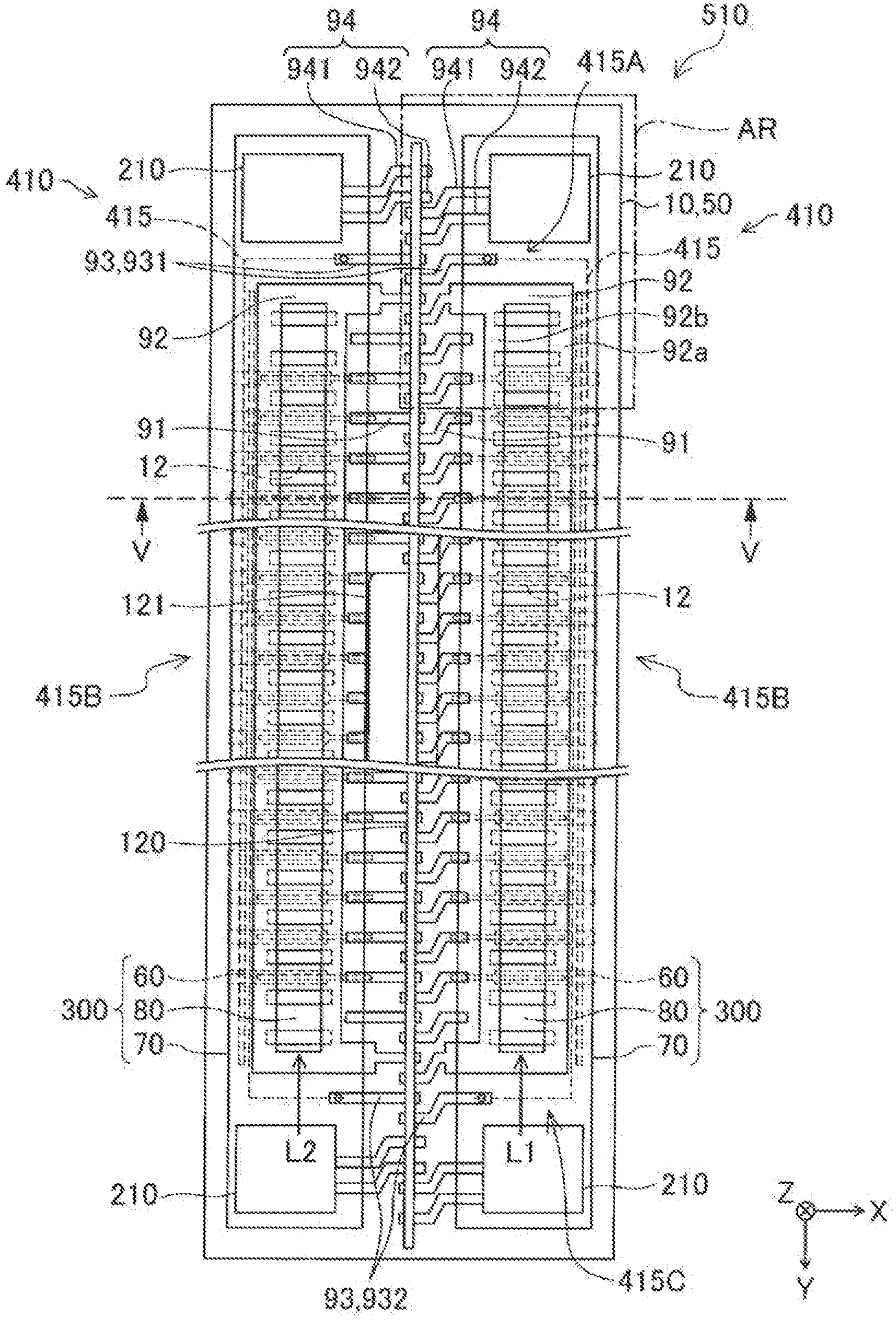
FIG. 4 is an explanatory diagram illustrating a configuration of the liquid ejecting head in plan view.
Figure 5:
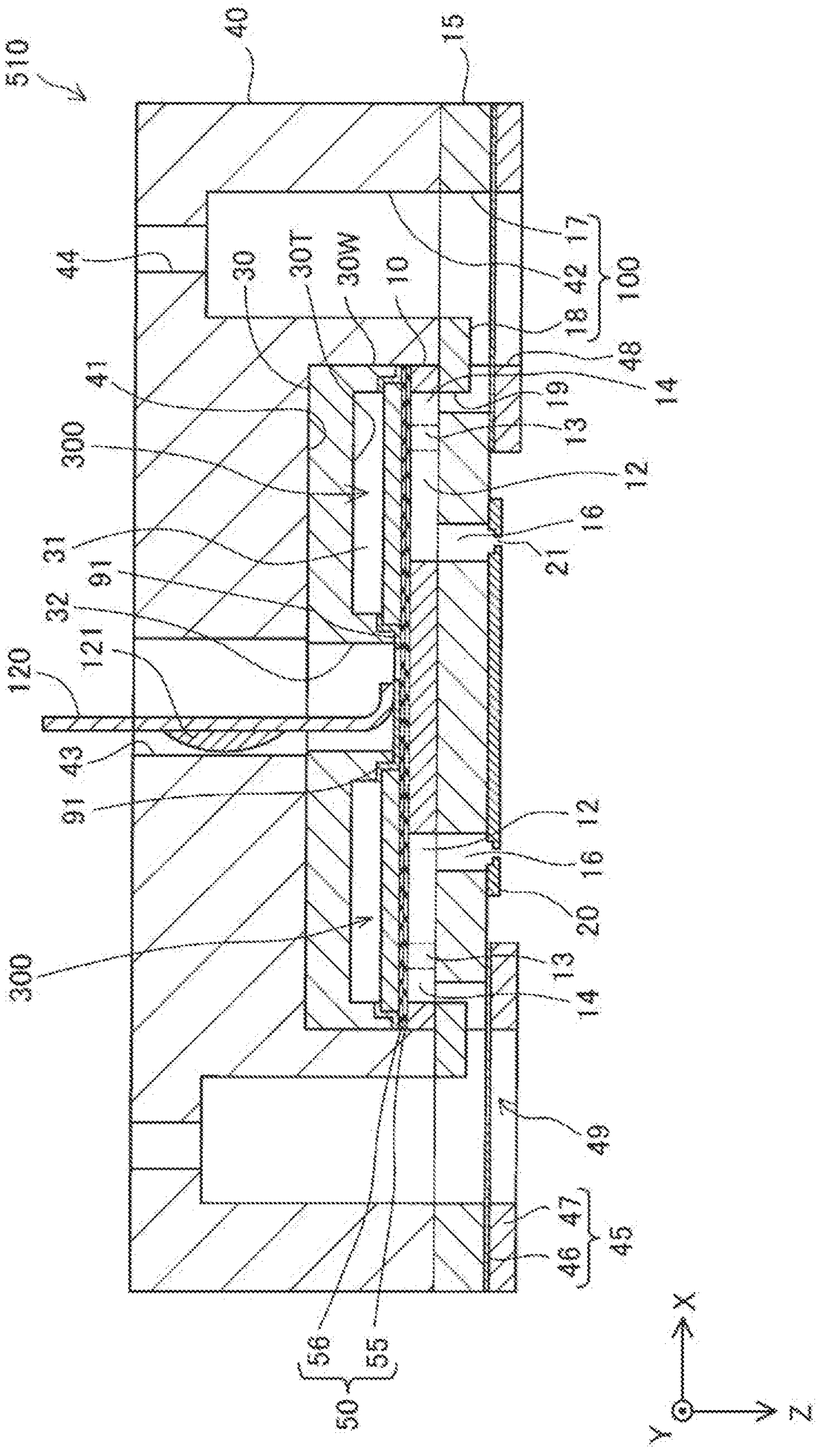
FIG. 5 is a cross-sectional view illustrating a V-V position of FIG. 4.

A detailed configuration of the liquid ejecting head 510 will be described with reference to FIG. 3 to FIG. 5. FIG. 3 is an exploded perspective view illustrating the configuration of the liquid ejecting head 510. FIG. 4 is an explanatory diagram illustrating the configuration of the liquid ejecting head 510 in plan view. In the present disclosure, the "plan view" means a state in which an object is viewed along a lamination direction to be described later. FIG. 4 illustrates the configuration around a pressure chamber substrate 10 and a vibration plate 50 in the liquid ejecting head 510. In order to facilitate understanding of the technique, a protective film 82, a sealing substrate 30, a case member 40, and the like are not illustrated. FIG. 5 is a cross-sectional view illustrating a V-V position of FIG. 4.

The liquid ejecting head 510 includes a pressure chamber substrate 10, a communication plate 15, a nozzle plate 20, a compliance substrate 45, a vibration plate 50, a sealing substrate 30, a case member 40, a wiring substrate 120, which are illustrated in FIG. 3, and a piezoelectric element 300 illustrated in FIG. 4. The liquid ejecting head 510 is configured by laminating these laminated members. In the present disclosure, a direction in which the laminated members of the liquid ejecting head 510 are laminated is also referred to as a "lamination direction". In the present embodiment, the lamination direction coincides with the Z-axis direction. In the present disclosure, the +Z direction side with respect to a predetermined reference position is also referred to as "one side of the lamination direction" or "lower side", and the −Z direction side with respect to a predetermined reference position is also referred to as "the other side of the lamination direction" or "upper side".

The pressure chamber substrate 10 is configured by using, for example, a silicon substrate, a glass substrate, an SOI substrate, various ceramic substrates, and the like. As illustrated in FIG. 4, a plurality of pressure chambers 12 are provided on the pressure chamber substrate 10. An ink flow path provided on the pressure chamber substrate 10, such as the pressure chamber 12, is formed by anisotropically etching the pressure chamber substrate 10 from the surface on the +Z direction side. The pressure chamber 12 is formed in a substantially rectangular shape in which a length in the X-axis direction is longer than a length in the Y-axis direction in plan view. On the other hand, the shape of the pressure chamber 12 is not limited to the rectangular shape, and may be a parallelogram shape, a polygonal shape, a circular shape, an oval shape, or the like. The oval shape means a shape in which both end portions in a longitudinal direction are semicircular based on a rectangular shape, and includes a rounded rectangular shape, an elliptical shape, an egg shape, and the like.

As illustrated in FIG. 4, a plurality of pressure chambers 12 are arranged along a predetermined direction in the pressure chamber substrate 10. In plan view of the liquid ejecting head 510 along the lamination direction, a direction in which the plurality of pressure chambers 12 are arranged is also referred to as an "arrangement direction". In the present embodiment, the plurality of pressure chambers 12 are arranged in two rows parallel to each other with the Y-axis direction as the arrangement direction. In the example of FIG. 4, the pressure chamber substrate 10 is provided with two pressure chamber rows, that is, a first pressure chamber row L1 having a first arrangement direction parallel to the Y-axis direction and a second pressure chamber row L2 having a second arrangement direction parallel to the Y-axis direction. The first pressure chamber row L1 and the second pressure chamber row L2 are disposed on both sides with the wiring substrate 120 interposed therebetween. Specifically, the second pressure chamber row L2 is disposed on the opposite side of the first pressure chamber row L1 with the wiring substrate 120 interposed therebetween in the direction that intersects with the arrangement direction of the first pressure chamber row L1. The direction orthogonal to both the arrangement direction and the lamination direction is also referred to as an "intersection direction". In the example of FIG. 4, the intersection direction is the X-axis direction, and the second pressure chamber row L2 is disposed in the −X direction with respect to the first pressure chamber row L1 with the wiring substrate 120 interposed between the first pressure chamber row L1 and the second pressure chamber row L2. The plurality of pressure chambers 12 do not necessarily have to be arranged in a straight line, and, for example, the plurality of pressure chambers 12 may be arranged along the Y-axis direction according to so-called staggered arrangement to be alternately disposed in the intersection direction.

As illustrated in FIG. 3, the communication plate 15, the nozzle plate 20, and the compliance substrate 45 are laminated on the +Z direction side of the pressure chamber substrate 10. The communication plate 15 is, for example, a flat plate member using a silicon substrate, a glass substrate, an SOI substrate, various ceramic substrates, a metal substrate, or the like. Examples of the metal substrate include a stainless steel substrate or the like. The communication plate 15 is provided with a nozzle communication path 16, a first manifold portion 17, a second manifold portion 18 illustrated in FIG. 5, and a supply communication path 19. Preferably, the communication plate 15 is formed by using a material having a thermal expansion coefficient substantially the same as a thermal expansion coefficient of the pressure chamber substrate 10. Thereby, when the temperatures of the pressure chamber substrate 10 and the communication plate 15 change, warpage of the pressure chamber substrate 10 and the communication plate 15 because of a difference in the thermal expansion coefficient can be suppressed.

As illustrated in FIG. 5, the nozzle communication path 16 is a flow path that communicates the pressure chamber 12 and a nozzle 21. The first manifold portion 17 and the second manifold portion 18 function as a part of a manifold 100 which is a common liquid chamber in which a plurality of pressure chambers 12 communicate with each other. The first manifold portion 17 is provided to penetrate the communication plate 15 in the Z-axis direction. Further, as illustrated in FIG. 5, the second manifold portion 18 is provided on a surface of the communication plate 15 on the +Z direction side without penetrating the communication plate 15 in the Z-axis direction.

As illustrated in FIG. 5, the supply communication path 19 is a flow path coupled to a pressure chamber supply path 14 provided on the pressure chamber substrate 10. The pressure chamber supply path 14 is a flow path coupled to one end portion of the pressure chamber 12 in the X-axis direction via a throttle portion 13. The throttle portion 13 is a flow path provided between the pressure chamber 12 and the pressure chamber supply path 14. The throttle portion 13 is a flow path in which an inner wall protrudes from the pressure chamber 12 and the pressure chamber supply path 14 and which is formed narrower than the pressure chamber 12 and the pressure chamber supply path 14. Thereby, the throttle portion 13 is set such that the flow path resistance is higher than those of the pressure chamber 12 and the pressure chamber supply path 14. With the configuration, even when pressure is applied to the pressure chamber 12 by the piezoelectric element 300 when the ink is ejected, the ink in the pressure chamber 12 can be suppressed or prevented from flowing back to the pressure chamber supply path 14. A plurality of supply communication paths 19 are arranged along the Y-axis direction, that is, the arrangement direction, and are individually provided for each of the pressure chambers 12. The supply communication path 19 and the pressure chamber supply path 14 communicate the second manifold portion 18 with each pressure chamber 12, and supply the ink in the manifold 100 to each pressure chamber 12.

The nozzle plate 20 is provided on a side opposite to the pressure chamber substrate 10, that is, on a surface of the communication plate 15 on the +Z direction side with the communication plate 15 interposed between the nozzle plate 20 and the pressure chamber substrate 10. A material of the nozzle plate 20 is not particularly limited, and for example, a silicon substrate, a glass substrate, an SOI substrate, various ceramic substrates, and a metal substrate can be used. Examples of the metal substrate include a stainless steel substrate or the like. As the material of the nozzle plate 20, an organic substance, such as a polyimide resin, can also be used. On the other hand, it is preferable to use a material for the nozzle plate 20 that has substantially the same thermal expansion coefficient as the thermal expansion coefficient of the communication plate 15. Thereby, when the temperatures of the nozzle plate 20 and the communication plate 15 change, warpage of the nozzle plate 20 and the communication plate 15 because of the difference in the thermal expansion coefficient can be suppressed.

A plurality of nozzles 21 are provided on the nozzle plate 20. Each nozzle 21 communicates with each pressure chamber 12 via the nozzle communication path 16. As illustrated in FIG. 3, the plurality of nozzles 21 are arranged along the arrangement direction of the pressure chambers 12, that is, the Y-axis direction. The nozzle plate 20 is provided with two nozzle rows in which the plurality of nozzles 21 are arranged in a row. The two nozzle rows respectively correspond to the first pressure chamber row L1 and the second pressure chamber row L2.

As illustrated in FIG. 5, the compliance substrate 45 is provided together with the nozzle plate 20 on the side opposite to the pressure chamber substrate 10 with the communication plate 15 interposed therebetween, that is, on a surface of the communication plate 15 on the +Z direction side. The compliance substrate 45 is provided on the periphery of the nozzle plate 20, and covers openings of the first manifold portion 17 and the second manifold portion 18 provided in the communication plate 15. The compliance substrate 45 includes, for example, a sealing film 46 made of a flexible thin film and a fixed substrate 47 made of a hard material such as a metal. As illustrated in FIG. 5, a region of the fixed substrate 47 facing the manifold 100 is completely removed in a thickness direction, and thus an opening portion 48 is defined. Therefore, one surface of the manifold 100 is a compliance portion 49 sealed only by the sealing film 46.

As illustrated in FIG. 5, the vibration plate 50 and the piezoelectric element 300 are laminated on a side opposite to the communication plate 15 or the like, that is, on a surface of the pressure chamber substrate 10 on the −Z direction side with the pressure chamber substrate 10 interposed therebetween. The piezoelectric element 300 bends and deforms the vibration plate 50 to cause a pressure change in the ink in the pressure chamber 12. In FIG. 5, illustration of the piezoelectric element 300 is simplified.

The vibration plate 50 is provided between the piezoelectric element 300 and the pressure chamber substrate 10. The vibration plate 50 is provided on the pressure chamber substrate 10 side, and includes an elastic film 55 containing silicon oxide ($SiO_2$) and an insulator film 56 that is provided on the elastic film 55 and contains a zirconium oxide film ($ZrO_2$). The elastic film 55 constitutes a surface of the flow path, such as the pressure chamber 12, on the −Z direction side. The vibration plate 50 may be configured with, for example, either the elastic film 55 or the insulator film 56, and may further include another film other than the elastic film 55 and the insulator film 56. Examples of the material of the other film include silicon, silicon nitride, and the like.

As illustrated in FIG. 3, the sealing substrate 30 having substantially the same size as the pressure chamber substrate 10 in plan view is further bonded to the surface of the pressure chamber substrate 10 on the −Z direction side by an adhesive or the like. As illustrated in FIG. 5, the sealing substrate 30 includes a ceiling portion 30T, a wall portion 30W, a holding portion 31, and a through hole 32. The holding portion 31 is a space defined by the ceiling portion 30T and the wall portion 30W, and protects an active portion of the piezoelectric element 300 by accommodating the piezoelectric element 300. In the present embodiment, the holding portions 31 are provided for each row of the piezoelectric elements 300. More specifically, two holding portions 31 corresponding to the first pressure chamber row L1 and the second pressure chamber row L2 are formed to be adjacent to each other. The through hole 32 penetrates the sealing substrate 30 along the Z-axis direction. The through hole 32 is disposed between the two holding portions 31 in plan view, and is formed in a long rectangular shape along the Y-axis direction.

As illustrated in FIG. 5, the case member 40 is fixed on the sealing substrate 30. The case member 40 forms the manifold 100 that communicates with the plurality of pressure chambers 12, together with the communication plate 15. The case member 40 has substantially the same outer shape as the communication plate 15 in plan view, and is bonded to cover the sealing substrate 30 and the communication plate 15.

The case member 40 includes an accommodation section 41, a supply port 44, a third manifold portion 42, and a coupling port 43. The accommodation section 41 is a space having a depth in which the pressure chamber substrate 10, the vibration plate 50, and the sealing substrate 30 can be accommodated. The third manifold portion 42 is a space provided in the vicinity of both ends of the accommodation section 41 in the X-axis direction in the case member 40. The manifold 100 is formed by coupling the third manifold portion 42 to the first manifold portion 17 and the second manifold portion 18 provided in the communication plate 15. The manifold 100 has a long shape in the Y-axis direction. The supply port 44 communicates with the manifold 100 to supply ink to each manifold 100. The coupling port 43 is a through hole that communicates with the through hole 32 of the sealing substrate 30, and the wiring substrate 120 is inserted to the coupling port 43.

In the liquid ejecting head 510, the ink supplied from the ink tank 550 illustrated in FIG. 1 is taken from the supply port 44 illustrated in FIG. 5, and an internal flow path from the manifold 100 to the nozzle 21 is filled with ink. Thereafter, a voltage based on the drive signal is applied to each of the piezoelectric elements 300 corresponding to the plurality of pressure chambers 12. Thereby, the vibration plate 50 bends and deforms together with the piezoelectric element 300, and thus the internal pressure of each pressure chamber 12 increases because of a change in volume of each pressure chamber 12. Therefore, ink droplets are ejected from each nozzle 21.

Figure 6:
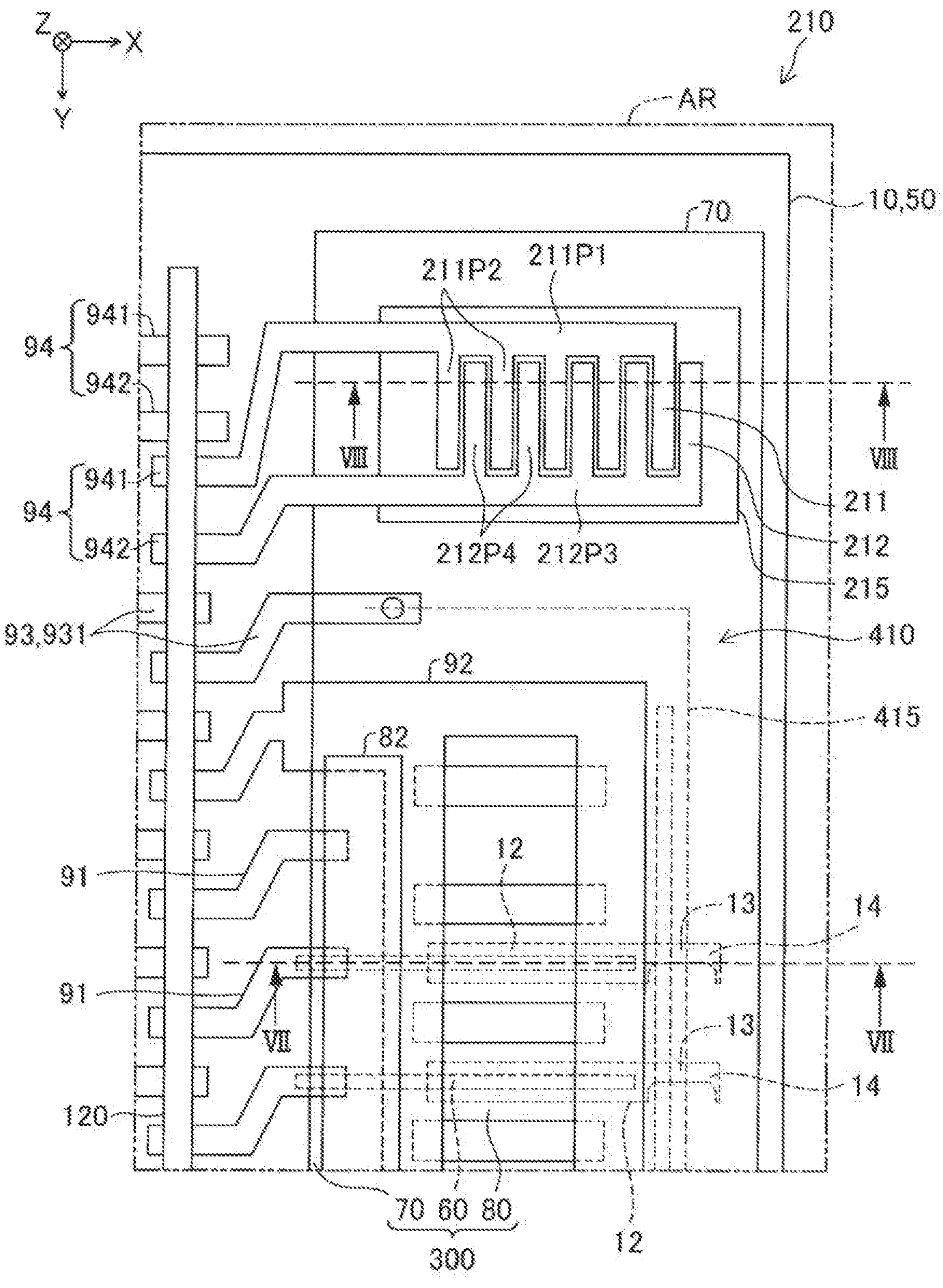
FIG. 6 is an enlarged explanatory diagram illustrating a partial range of FIG. 4.
Figure 7:
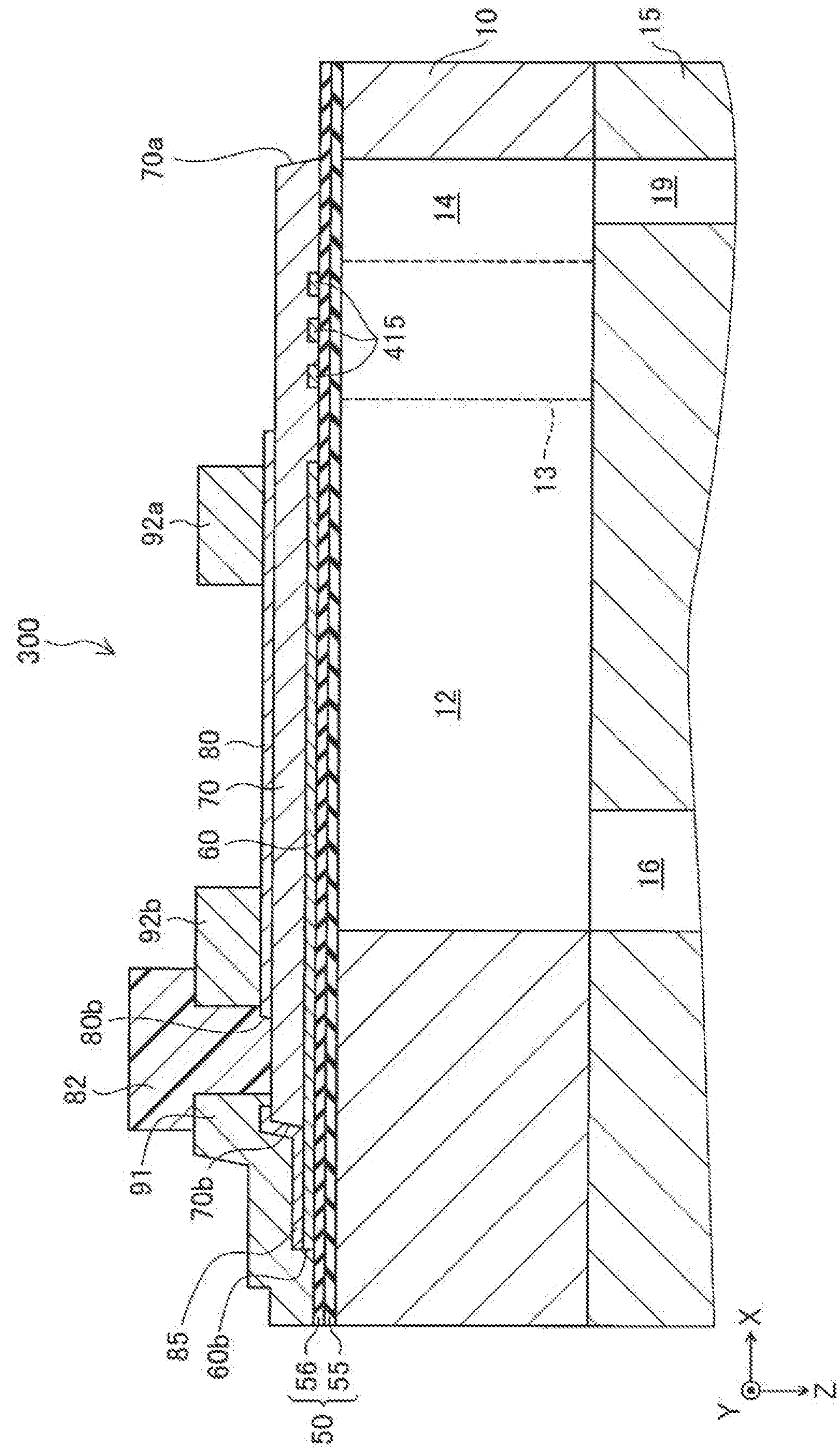
FIG. 7 is a cross-sectional view illustrating a VII-VII position of FIG. 6.

Configurations of the piezoelectric element 300, the humidity detection section 210, and the temperature detection section 410 will be described with reference to FIG. 6 to FIG. 8 as appropriate together with reference to FIG. 4 and FIG. 5. FIG. 6 is an enlarged explanatory diagram illustrating a partial range AR of FIG. 4. FIG. 7 is a cross-sectional view illustrating a VII-VII position of FIG. 6.

As illustrated in FIG. 7, the piezoelectric element 300 includes a first drive electrode 60, a piezoelectric body 70, and a second drive electrode 80. The first drive electrode 60, the piezoelectric body 70, and the second drive electrode 80 are laminated in this order in the −Z direction of the lamination direction. The piezoelectric body 70 is provided between the first drive electrode 60 and the second drive electrode 80 in the lamination direction.

As illustrated in FIG. 6, the first drive electrode 60 and the second drive electrode 80 are electrically coupled to the wiring substrate 120 illustrated in FIG. 5 via a first drive wiring 91 and a second drive wiring 92. The first drive electrode 60 and the second drive electrode 80 apply a voltage according to the drive signal to the piezoelectric body 70. When a voltage is applied between the first drive electrode 60 and the second drive electrode 80, a part, at which piezoelectric distortion occurs in the piezoelectric body 70, in the piezoelectric element 300 is also referred to as an active portion.

A different drive voltage is applied to the first drive electrode 60 according to an ejection amount of ink, and a predetermined reference voltage is applied to the second drive electrode 80 regardless of the ejection amount of ink. When a voltage difference occurs between the first drive electrode 60 and the second drive electrode 80 because of the application of the drive voltage and the reference voltage, the piezoelectric body 70 of the piezoelectric element 300 is deformed. Because of the deformation of the piezoelectric body 70, the vibration plate 50 is deformed or vibrated, and thus the volume of the pressure chamber 12 changes. Because of the change in the volume of the pressure chamber 12, pressure is applied to the ink accommodated in the pressure chamber 12, and thus the ink is ejected from the nozzle 21 via the nozzle communication path 16.

In the present embodiment, the first drive electrode 60 is an individual electrode individually provided for the plurality of pressure chambers 12. As illustrated in FIG. 7, the first drive electrode 60 is a lower electrode provided on a side opposite to the second drive electrode 80 with the piezoelectric body 70 interposed therebetween, that is, on a lower side of the piezoelectric body 70. A thickness of the first drive electrode 60 is formed to be, for example, approximately 80 nanometers. For example, the first drive electrode 60 is formed of a conductive material including a metal, such as platinum (Pt), iridium (Ir), gold (Au), titanium (Ti), and a conductive metal oxide such as indium tin oxide abbreviated as ITO. The first drive electrode 60 may be formed by laminating a plurality of materials such as platinum (Pt), iridium (Ir), gold (Au), and titanium (Ti). In the present embodiment, platinum (Pt) is used for the first drive electrode 60.

As illustrated in FIG. 4, the piezoelectric body 70 has a predetermined width in the X-axis direction, and has a long rectangular shape along the arrangement direction of the pressure chambers 12, that is, the Y-axis direction. The thickness of the piezoelectric body 70 is formed, for example, from approximately 1000 nanometers to 4000 nanometers. Examples of the piezoelectric body 70 include a crystal film having a perovskite structure provided on the first drive electrode 60 and made of a ferroelectric ceramic material exhibiting an electromechanical conversion action, that is, a so-called perovskite type crystal. As the material of the piezoelectric body 70, for example, a ferroelectric piezoelectric material such as lead zirconate titanate (PZT) or a material to which a metal oxide, such as niobium oxide, nickel oxide, or magnesium oxide, is added can be used. Specifically, lead titanate ($PbTiO_3$), lead zirconate titanate ($Pb(Zr, Ti)O_3$), lead zirconate ($PbZrO_3$), lead lanthanum titanate ($(Pb, La), TiO_3$), lead lanthanum zirconate titanate ($(Pb, La) (Zr, Ti)O_3$), lead magnesium niobate zirconate ($Pb(Zr, Ti) (Mg, Nb)O_3$), or the like can be used. In the present embodiment, lead zirconate titanate (PZT) is used for the piezoelectric body 70.

The material of the piezoelectric body 70 is not limited to the lead-based piezoelectric material containing lead, and a non-lead-based piezoelectric material containing no lead can also be used. Examples of the non-lead-based piezoelectric material include bismuth iron acid ($(BiFeO_3)$, abbreviated to "BFO"), barium titanate ($(BaTiO_3)$, abbreviated to "BT"), potassium sodium niobate ($(K, Na) (NbO_3)$, abbreviated to "KNN"), potassium sodium lithium niobate ($(K, Na, Li) (NbO_3)$), potassium sodium lithium tantalate niobate ($(K, Na, Li) (Nb, Ta)O_3$), bismuth potassium titanate ($(Bi_{1/2}K_{1/2}) TiO_3$, abbreviated to "BKT"), bismuth sodium titanate ($(Bi_{1/2}Na_{1/2}) TiO_3$, abbreviated to "BNT"), bismuth manganate ($BiMnO_3$, abbreviated to "BM"), a composite oxide containing bismuth, potassium, titanium, and iron and having a perovskite structure ($x[(Bi_xK_{1-x}) TiO_3]$-$(1-x) [BiFeO_3]$, abbreviated to "BKT-BF"), a composite oxide containing bismuth, iron, barium, and titanium and having a perovskite structure ($(1-x) [BiFeO_3]$-$x[BaTiO_3]$, abbreviated to "BFO-BT"), and a material ($(1-x) [Bi(Fe_{1-y}M_y) O_3]$-$x[BaTiO_3]$, M being Mn, Co, or Cr), which is obtained by adding metals such as manganese, cobalt, and chromium to the composite oxide.

As illustrated in FIG. 4, the second drive electrode 80 is a common electrode that is commonly provided for the plurality of pressure chambers 12. The second drive electrode 80 has a predetermined width in the X-axis direction, and is provided to extend along the arrangement direction of the pressure chambers 12, that is, the Y-axis direction. As illustrated in FIG. 7, the second drive electrode 80 is an upper electrode provided on a side opposite to the first drive electrode 60 with the piezoelectric body 70 interposed therebetween, that is, on an upper side of the piezoelectric body 70. As a material of the second drive electrode 80, similar to the first drive electrode 60, for example, metals, such as platinum (Pt), iridium (Ir), gold (Au), and titanium (Ti), and conductive materials including conductive metal oxides, such as indium tin oxide abbreviated as ITO, are used. The second drive electrode 80 may be formed by laminating a plurality of materials such as platinum (Pt), iridium (Ir), gold (Au), and titanium (Ti). In the present embodiment, iridium (Ir) is used for the second drive electrode 80.

As illustrated in FIG. 7, a protective film 82 is provided on an end portion **80*b* of the second drive electrode 80 on the −X direction side. As a material of the protective film 82, a material having an electrical insulating property and a moisture barrier property is used. For the protective film 82, for example, an oxide insulating film such as aluminum oxide or hafnia, a polymer material film such as polyimide, or the like can be adopted. When the protective film 82 is a photosensitive resin such as polyimide, a resist layer used in a manufacturing process can be used. When the protective film 82 is made of a resin material, the surface resistance easily changes depending on the humidity, and thus the protective film 82 can be suitably used for an interlayer 215. In the present embodiment, polyimide is used for the protective film 82**.

As illustrated in FIG. 6, the protective film 82 is disposed at a drive electrode end portion position that overlaps the end portion **80*b* of the second drive electrode 80 in plan view of the liquid ejecting head 510, and is formed to cover the end portion 80*b* and the surface of the piezoelectric body 70. By covering the surface of the piezoelectric body 70 with the protective film 82, the piezoelectric body 70 can be protected from moisture in the outside air and the air. Therefore, the protective film 82 is preferably made of a material having low water vapor permeability. Further, by covering the end portion 80*b* with the protective film 82, peeling of the second drive electrode 80 from the end portion 80*b* can be suppressed or prevented. Further, by covering the end portion 80*b*, driving of the piezoelectric element 300 in the vicinity of the end portion of the active portion of the piezoelectric element 300 can be suppressed. As a result, for example, occurrence of a physical damage such as a crack in a member in the vicinity of the end portion of the active portion, such as a joint portion between the vibration plate 50 and the pressure chamber substrate 10 and the vibration plate 50, can be suppressed. For this reason, the protective film 82 is preferably made of, for example, a material having a high elastic modulus or a high Young's modulus. For example, the Young's modulus is preferably equal to or higher than 2 GPa from a viewpoint of suitable driving suppression. Further, the protective film 82 has an insulating property, and thus a progress of migration between wirings such as wirings between the end portion 80*b* and the first drive wiring 91 or the like can be suppressed or prevented. When the second drive electrode 80 is disposed on the lower side of the piezoelectric body 70 as a lower electrode and the first drive electrode 60 is disposed on the upper side of the piezoelectric body 70 as an upper electrode, the drive electrode end portion position means a position overlapping the end portion of the first drive electrode 60 on the −X direction side. On the other hand, the drive electrode end portion position is not limited to only the end portion of the first drive electrode 60 on the −X direction side, and may be set by using an end portion located in any direction of the first drive electrode 60 or the second drive electrode 80, or by using a plurality of end portions obtained by combining end portions of the first drive electrode 60 and the second drive electrode 80**.

As illustrated in FIG. 7, a wiring portion 85 is provided on the further −X direction side of the end portion **80*b* of the second drive electrode 80 in the −X direction. The wiring portion 85 is in the same layer as the second drive electrode 80, but is electrically discontinuous with the second drive electrode 80. The wiring portion 85 is formed from the end portion 70*b* of the piezoelectric body 70 in the −X direction to the end portion 60*b* of the first drive electrode 60 in the −X direction in a state of being spaced from the end portion 80*b* of the second drive electrode 80. The end portion 60*b* of the first drive electrode 60 in the −X direction is pulled out from the end portion 70*b* of the piezoelectric body 70 to the outside. The wiring portion 85 is provided for each piezoelectric element 300, and a plurality of wiring portions 85 are disposed at predetermined intervals along the Y-axis direction. Preferably, the wiring portion 85 is formed in the same layer as the second drive electrode 80. Thereby, a manufacturing process of the wiring portion 85 can be simplified and the cost can be reduced. Here, the wiring portion 85 may be formed in a layer different from the layer of the second drive electrode 80**.

As illustrated in FIG. 6 and FIG. 7, the first drive wiring 91 is electrically coupled to the first drive electrode 60 which is an individual electrode, and an extension portion 92*a* and an extension portion 92*b* of the second drive wiring 92 are electrically coupled to the second drive electrode 80 which is a common electrode. The first drive wiring 91 and the second drive wiring 92 function as drive wirings for applying a voltage for driving the piezoelectric body 70 from the wiring substrate 120.

The materials of the first drive wiring 91 and the second drive wiring 92 are conductive materials. For example, gold (Au), copper (Cu), titanium (Ti), tungsten (W), nickel (Ni), chromium (Cr), platinum (Pt), aluminum (Al), and the like can be used. In the present embodiment, gold (Au) is used for the first drive wiring 91 and the second drive wiring 92. The first drive wiring 91 and the second drive wiring 92 are formed in the same layer to be electrically discontinuous with each other. Thereby, a process of forming the first drive wiring 91 can be shared with a process of forming the second drive wiring 92. Therefore, as compared with when the first drive wiring 91 and the second drive wiring 92 are individually formed, the manufacturing process can be simplified and productivity of the liquid ejecting head 510 can be improved. Here, the first drive wiring 91 and the second drive wiring 92 may be formed in different layers instead of being formed in the same layer. In addition, the first drive wiring 91 and the second drive wiring 92 may include an adhesion layer for improving adhesion to the first drive electrode 60, the second drive electrode 80, and the vibration plate 50.

The first drive wiring 91 is individually provided for each first drive electrode 60. As illustrated in FIG. 7, the first drive wiring 91 is coupled to the vicinity of the end portion 60*b* of the first drive electrode 60 via the wiring portion 85, and is pulled out in the −X direction to reach a top of the vibration plate 50. The first drive wiring 91 is electrically coupled to the end portion 60*b* of the first drive electrode 60 in the −X direction, the end portion 60*b* being pulled out from the end portion 70*b* of the piezoelectric body 70 to the outside. The wiring portion 85 may be omitted, and the first drive wiring 91 may be directly coupled to the end portion 60*b* of the first drive electrode 60.

As illustrated in FIG. 4, the second drive wiring 92 extends along the Y-axis direction, bends at both ends in the Y-axis direction, and is pulled out along the X-axis direction. The second drive wiring 92 includes an extension portion 92*a* extending along the Y-axis direction and an extension portion 92*b*. As illustrated in FIG. 4 and FIG. 5, the end portions of the first drive wiring 91 and the second drive wiring 92 are extended so as to be exposed to the through hole 32 of the sealing substrate 30, and are electrically coupled to the wiring substrate 120 in the through hole 32.

The wiring substrate 120 is configured with, for example, a flexible printed circuit (FPC). The wiring substrate 120 is provided with a plurality of wirings for coupling to the control device 580 and a power supply circuit (not illustrated). In addition, the wiring substrate 120 may be configured with any flexible substrate, such as flexible flat cable (FFC), instead of FPC. An integrated circuit 121 including a switching element and the like is mounted at the wiring substrate 120. A command signal or the like for driving the piezoelectric element 300 is input to the integrated circuit 121. The integrated circuit 121 controls a timing at which a drive signal for driving the piezoelectric element 300 is supplied to the first drive electrode 60 based on the command signal.

As illustrated in FIG. 6, the temperature detection section 410 includes a temperature detection resistor 415 and temperature detection wirings 93. The temperature detection resistor 415 is a resistance wiring used for detecting the temperature of the ink in the pressure chamber. The temperature detection wiring 93 electrically couples the wiring substrate 120 and the temperature detection resistor 415. More specifically, the temperature detection wirings 93 include a first temperature detection wiring 931 coupled to one end of the temperature detection resistor 415 and a second temperature detection wiring 932 coupled to the other end of the temperature detection resistor 415. The temperature detection wirings 93 are formed in the same layer as, for example, layers of the first drive wiring 91, the second drive wiring 92, and a humidity detection wiring 94 to be described later, and are formed so as to be electrically discontinuous with each other. An end portion of the temperature detection wiring 93 extends so as to be exposed to the through hole 32 of the sealing substrate 30, and is electrically coupled to the wiring substrate 120 in the through hole 32.

A material of the temperature detection resistor 415 is a material of which the resistance value is temperature dependent. For example, gold (Au), platinum (Pt), iridium (Ir), aluminum (Al), copper (Cu), titanium (Ti), tungsten (W), nickel (Ni), chromium (Cr), or the like may be used. Here, platinum (Pt) can be preferably used as a material of the temperature detection resistor 415 from a viewpoint that the change in resistance with temperature is large and stability and accuracy are high.

As illustrated in FIG. 7, the temperature detection resistor 415 is formed in the same layer as, for example, the layer of the first drive electrode 60 in the lamination direction, and is formed so as to be electrically discontinuous with the first drive electrode 60. In the present embodiment, the temperature detection resistor 415 is formed together with the first drive electrode 60 in a process of forming the first drive electrode 60. As a result, the temperature detection resistor 415 is formed of platinum (Pt), which is the same material as the first drive electrode 60, and a thickness of the temperature detection resistor 415 is approximately 80 nanometers similar to the first drive electrode 60. Here, the temperature detection resistor 415 is not limited thereto, may be individually formed separately from the first drive electrode 60, or may be formed together with a conductor wiring different from the conductor wiring of the first drive electrode 60.

A material of the temperature detection wiring 93 is a conductive material. For example, gold (Au), copper (Cu), titanium (Ti), tungsten (W), nickel (Ni), chromium (Cr), platinum (Pt), aluminum (Al), and the like can be used. The material of the temperature detection wiring 93 is gold (Au) that is the same as the materials of the first drive wiring 91, the second drive wiring 92, and the humidity detection wiring 94. Here, any material other than gold (Au) may be used for the temperature detection wiring 93, and the material may be different from the materials of the first drive wiring 91, the second drive wiring 92, and the humidity detection wiring 94.

As illustrated in FIG. 4, in the present embodiment, the temperature detection resistor 415 is continuously formed so as to surround the vicinities of the first pressure chamber row L1 and the second pressure chamber row L2 in plan view. More specifically, the temperature detection resistor 415 includes a first extension portion 415A electrically coupled to the first temperature detection wiring 931, a third extension portion 415C electrically coupled to the second temperature detection wiring 932, and second extension portions 415B between the first extension portion 415A and the third extension portion 415C.

The first extension portion 415A extends along the X-axis direction, which is the intersection direction, on one side in the arrangement direction of the plurality of pressure chambers 12, specifically, on the −Y direction side. The second extension portion 415B is further disposed on an outer side with respect to the first pressure chamber row L1 and the second pressure chamber row L2 in the liquid ejecting head 510, and extends along the Y-axis direction which is the arrangement direction. The third extension portion 415C extends along the X-axis direction, at a position on the other side in the arrangement direction of the plurality of pressure chambers 12, specifically, the +Y direction side. In this way, the temperature detection resistor 415 is disposed so as to surround the vicinities of the first pressure chamber row L1 and the second pressure chamber row L2. By widening a region in which the temperature detection resistor 415 is disposed, the temperature of the entire ink of the liquid ejecting head 510 can be detected.

As illustrated in FIG. 6 and FIG. 7, the temperature detection resistor 415 is disposed so as to pass the vicinity of the ink flow path in the pressure chamber substrate 10. More specifically, the second extension portion 415B of the temperature detection resistor 415 is disposed so as to pass the throttle portion 13 in the vicinity of each pressure chamber 12. In addition, as illustrated in FIG. 4, the second extension portion 415B is formed as a so-called zigzag pattern to be reciprocated a plurality of times along the arrangement direction. By lengthening a wiring length of the portion of the temperature detection resistor 415 that passes the vicinity of the pressure chamber 12 and is likely to contribute to the temperature detection of the ink, accuracy in detection of the temperature of the ink in the pressure chamber 12 can be improved. Here, the second extension portion 415B may be formed, for example, in a zigzag pattern to be reciprocated a plurality of times along the intersection direction instead of the arrangement direction, or may be formed, for example, in any shape such as a linear shape or a wave shape instead of the zigzag pattern. Further, the disposition position of the temperature detection resistor 415 is not limited to the position on the throttle portion 13, and may be any position on the pressure chamber 12. When the temperature detection resistor 415 cannot be disposed on the pressure chamber 12, the temperature detection resistor 415 may be disposed at a position close to the pressure chamber 12.

As illustrated in FIG. 4, in plan view, the humidity detection sections 210 are disposed at total four positions including positions adjacent to both sides of the first pressure chamber row L1 along the first arrangement direction and positions adjacent to both sides of the second pressure chamber row L2 along the second arrangement direction. The humidity detection sections 210 are individually provided for each of the holding portions 31 of the sealing substrate 30 corresponding to the first pressure chamber row L1 and the holding portion 31 of the sealing substrate 30 corresponding to the second pressure chamber row L2. Thereby, information on the humidity of each pressure chamber row can be acquired with high accuracy. Here, the positions of the humidity detection sections 210 are not limited to the four positions. The humidity detection sections 210 may be disposed at least any one position of positions adjacent to the first pressure chamber row L1 on the +Y direction side and the −Y direction side and positions adjacent to the second pressure chamber row L2 on the +Y direction side and the −Y direction side in the second arrangement direction. Here, preferably, the humidity detection sections 210 are formed in a number corresponding to the number of the holding portions 31.

As illustrated in FIG. 6, the humidity detection section 210 includes humidity detection wirings 94, a first detection electrode 211, a second detection electrode 212, and an interlayer 215. The interlayer 215 is a humidity detection target, and is formed of a material of which the resistance changes with humidity. For the interlayer 215, among the members included in the liquid ejecting head 510, as a member of which the performance may deteriorate because of the influence of the humidity, a member to be laminated on at least one of the piezoelectric body 70, the vibration plate 50, or the pressure chamber substrate 10 can be adopted. In the present embodiment, the same material as the material of the protective film 82 is used for the interlayer 215. In the present embodiment, the interlayer 215 is provided on the surface of the piezoelectric body 70 together with the protective film 82 in the process of forming the protective film 82. By sharing the process of forming the interlayer 215 with the process of forming the protective film 82, productivity of the liquid ejecting head 510 can be improved. The interlayer 215 may be doped with a metal such as chromium (Cr) by ion filling or the like such that a current for humidity detection is likely to flow.

The humidity detection wirings 94 include a first humidity detection wiring 941 that electrically couples the wiring substrate 120 and the first detection electrode 211 and a second humidity detection wiring 942 that electrically couples the wiring substrate 120 and the second detection electrode 212. End portions of the first humidity detection wiring 941 and the second humidity detection wiring 942 extend so as to be exposed to the through hole 32 of the sealing substrate 30, and are electrically coupled to the wiring substrate 120 in the through hole 32.

A material of the humidity detection wiring 94 is a conductive material. For example, gold (Au), copper (Cu), titanium (Ti), tungsten (W), nickel (Ni), chromium (Cr), platinum (Pt), aluminum (Al), and the like can be used. The material of the humidity detection wiring 94 is gold (Au) that is the same as the materials of the first drive wiring 91, the second drive wiring 92, and the temperature detection wiring 93. Here, any material other than gold (Au) may be used for the humidity detection wiring 94, and the material may be different from the materials of the first drive wiring 91, the second drive wiring 92, and the temperature detection wiring 93.

The first detection electrode 211 and the second detection electrode 212 are formed in the same layer without being in direct contact with each other so as to be electrically discontinuous to each other. The first detection electrode 211 and the second detection electrode 212 are provided on the interlayer 215 to be in contact with the interlayer 215 in order to allow the current from the humidity-detection power supply section 230, which is a constant current circuit, to flow on the surface of the interlayer 215. "current flows through the interlayer 215" includes that a current flows through the inside of the interlayer 215, the surface of the interlayer 215, and a boundary surface between the interlayer 215 and another layer.

Figure 8:
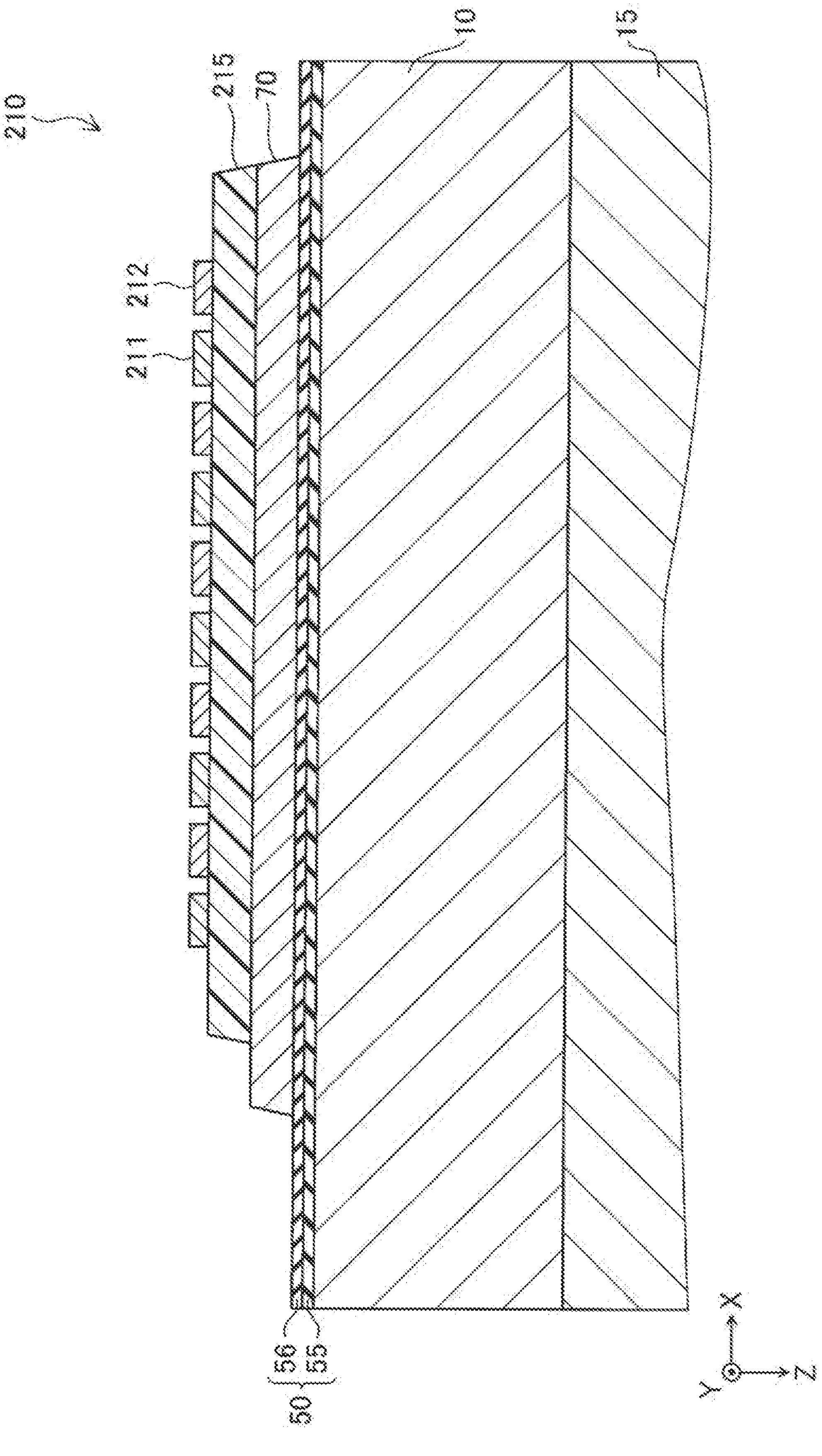
FIG. 8 is a cross-sectional view illustrating a VIII-VIII position of FIG. 6.

FIG. 8 is a cross-sectional view illustrating a VIII-VIII position of FIG. 6. In the present embodiment, as illustrated in FIG. 8, the first detection electrode 211 and the second detection electrode 212 are disposed on the other side of the lamination direction with respect to the interlayer 215, that is, on the upper surface of the interlayer 215. The surface of the interlayer 215 is exposed between the first detection electrode 211 and the second detection electrode 212, and the current from the first detection electrode 211 and the second detection electrode 212 may flow on the surface of the interlayer 215. Thereby, the resistance of the surface of the protective film 82 can be detected. Therefore, a temporal change in the moisture absorption state of the protective film 82 can be managed, and a temporal change in the performance of the protective film 82 because of humidity can be managed.

The first detection electrode 211 and the second detection electrode 212 can be formed in any shape. In the present embodiment, the first detection electrode 211 and the second detection electrode 212 adopt a so-called comb shape suitable for evaluation of insulation deterioration because of ion migration or the like, and are disposed so as to face each other on the surface of the interlayer 215. More specifically, as illustrated in FIG. 6, the first detection electrode 211 includes a first electrode portion 211P1 extending along a certain first direction and a plurality of second electrode portions 211P2 coupled to the first electrode portion 211P1. The plurality of second electrode portions 211P2 extend along a second direction intersecting with the first direction, and are arranged to be separated from each other. In the example of FIG. 6, the first direction coincides with the X-axis direction, and the second direction coincides with the Y-axis direction.

Similarly, the second detection electrode 212 includes a third electrode portion 212P3 extending along a certain third direction and a plurality of fourth electrode portions 212P4 coupled to the third electrode portion 212P3. The fourth electrode portions 212P4 extend along a fourth direction intersecting with the third direction, and are disposed to be separated from each other. In the example of FIG. 6, the third direction coincides with the X-axis direction, and is parallel to the first direction. The fourth direction coincides with the Y-axis direction, and is parallel to the second direction. As illustrated in FIG. 6, the plurality of second electrode portions 211P2 and the plurality of fourth electrode portions 212P4 are alternately disposed. A distance between the plurality of second electrode portions 211P2 and the plurality of fourth electrode portions 212P4 is preferably close enough to be suitable for migration evaluation, and is preferably constant regardless of location.

The first detection electrode 211 and the second detection electrode 212 can be formed of any conductive material, and can be formed of, for example, a conductive material such as a metal, such as platinum (Pt), iridium (Ir), gold (Au), and titanium (Ti), or a conductive metal oxide such as indium tin oxide which is abbreviated as ITO. The first detection electrode 211 and the second detection electrode 212 may be formed by laminating a plurality of materials such as platinum (Pt), iridium (Ir), gold (Au), and titanium (Ti). The first detection electrode 211 and the second detection electrode 212 may be made of the same material or different materials from each other.

In the present embodiment, the same iridium (Ir) as the material of the second drive electrode 80 is used for the first detection electrode 211 and the second detection electrode 212. By sharing the process of forming the first detection electrode 211 and the second detection electrode 212 with the process of forming the second drive electrode 80, productivity of the liquid ejecting head 510 can be improved. For the first detection electrode 211 and the second detection electrode 212, for example, gold (Au), copper (Cu), titanium (Ti), tungsten (W), nickel (Ni), chromium (Cr), platinum (Pt), aluminum (Al), or the like can also be used. The materials of the first detection electrode 211 and the second detection electrode 212 can be the same as the materials of the first drive wiring 91, the second drive wiring 92, the temperature detection wiring 93, and the humidity detection wiring 94. As an example of the process order when sharing the process of forming the first detection electrode 211 and the second detection electrode 212 with the process of forming the second drive electrode 80, first, the interlayer 215 is formed using the same material as the material of the protective film 82, and the first detection electrode 211, the second detection electrode 212, and the second drive electrode 80 are formed in the same process. Thereafter, the protective film 82 is formed at the drive electrode end portion position.

As described above, the liquid ejecting head 510 of the present embodiment includes the interlayer 215 which is laminated on the piezoelectric body 70 and of which the resistance changes according to humidity, the first detection electrode 211 which is in contact with the interlayer 215, and the second detection electrode 212 which is in contact with the interlayer 215, the second detection electrode 212 being disposed so as to face the first detection electrode 211. With the liquid ejecting head 510 configured as described above, by using the resistance between the first detection electrode 211 and the second detection electrode 212, the information on the humidity of the interlayer 215, which is laminated on the piezoelectric body 70 among the component members of the liquid ejecting head 510, can be detected with high accuracy. Therefore, the influence of the humidity on the piezoelectric element 300 or the member in the vicinity of the piezoelectric element 300 can be appropriately managed.

With the liquid ejecting head 510 of the present embodiment, the first detection electrode 211 and the second detection electrode 212 are disposed on the surface of the interlayer 215, and the surface of the interlayer 215 is exposed between the first detection electrode 211 and the second detection electrode 212. With the liquid ejecting head 510 configured as described above, the resistance of the surface of the interlayer 215 can be detected, and thus a temporal change in the performance of the interlayer 215 because of humidity can be evaluated.

The liquid ejecting apparatus 500 of the present embodiment includes, in addition to the liquid ejecting head 510, the humidity-detection resistance measurement section 240 that measures the resistance between the first detection electrode 211 and the second detection electrode 212 and the humidity management section 250 that acquires information on the humidity of the interlayer 215 by using the resistance measured by the humidity-detection resistance measurement section 240. Therefore, the liquid ejecting apparatus 500 that can appropriately manage the information on the humidity in the member in the liquid ejecting head 510 can be provided.

With the liquid ejecting head 510 of the present embodiment, the first detection electrode 211 and the second detection electrode 212 are formed of the same material as the material of the second drive electrode 80. The process of forming the first detection electrode 211 and the second detection electrode 212 can be shared with the process of forming the second drive electrode 80, and thus productivity of the liquid ejecting head 510 can be improved.

The liquid ejecting head 510 of the present embodiment further includes the protective film 82 that is disposed on an upper side of the pressure chamber substrate 10, more specifically, at the end portion 80*b* of the second drive electrode 80 and on the surface of the piezoelectric body 70, and is formed using a resin material. The interlayer 215 is formed of the same material as the material of the protective film 82. By forming the interlayer 215 using a resin material of which surface resistance is likely to change according to humidity, accuracy of detection of the information on humidity can be improved. Further, by sharing the process of forming the interlayer 215 with the process of forming the protective film 82, productivity of the liquid ejecting head 510 can be improved.

With the liquid ejecting head 510 of the present embodiment, the first detection electrode 211 and the second detection electrode 212 are disposed in the same layer on the upper side of the interlayer 215. By forming the first detection electrode 211 and the second detection electrode 212 in the same layer, the process of forming the first detection electrode 211 and the process of forming the second detection electrode 212 can be easily shared. Further, by detecting the resistance on the surface that is likely to be influenced by moisture absorption, accuracy of detection of humidity can be improved as compared with when the first detection electrode 211 and the second detection electrode 212 are provided on the inside.

With the liquid ejecting head 510 of the present embodiment, the humidity detection sections 210 are disposed at positions adjacent to both sides of the first pressure chamber row L1 along the first arrangement direction and positions adjacent to both sides of the second pressure chamber row L2 along the second arrangement direction. With the liquid ejecting head 510 configured as described above, by individually providing the humidity detection sections 210 for each of the holding portions 31 of the first pressure chamber row L1 and the second pressure chamber row L2, the information on humidity for each pressure chamber row can be acquired with high accuracy.

A2. Another Embodiment 1

Figure 9:
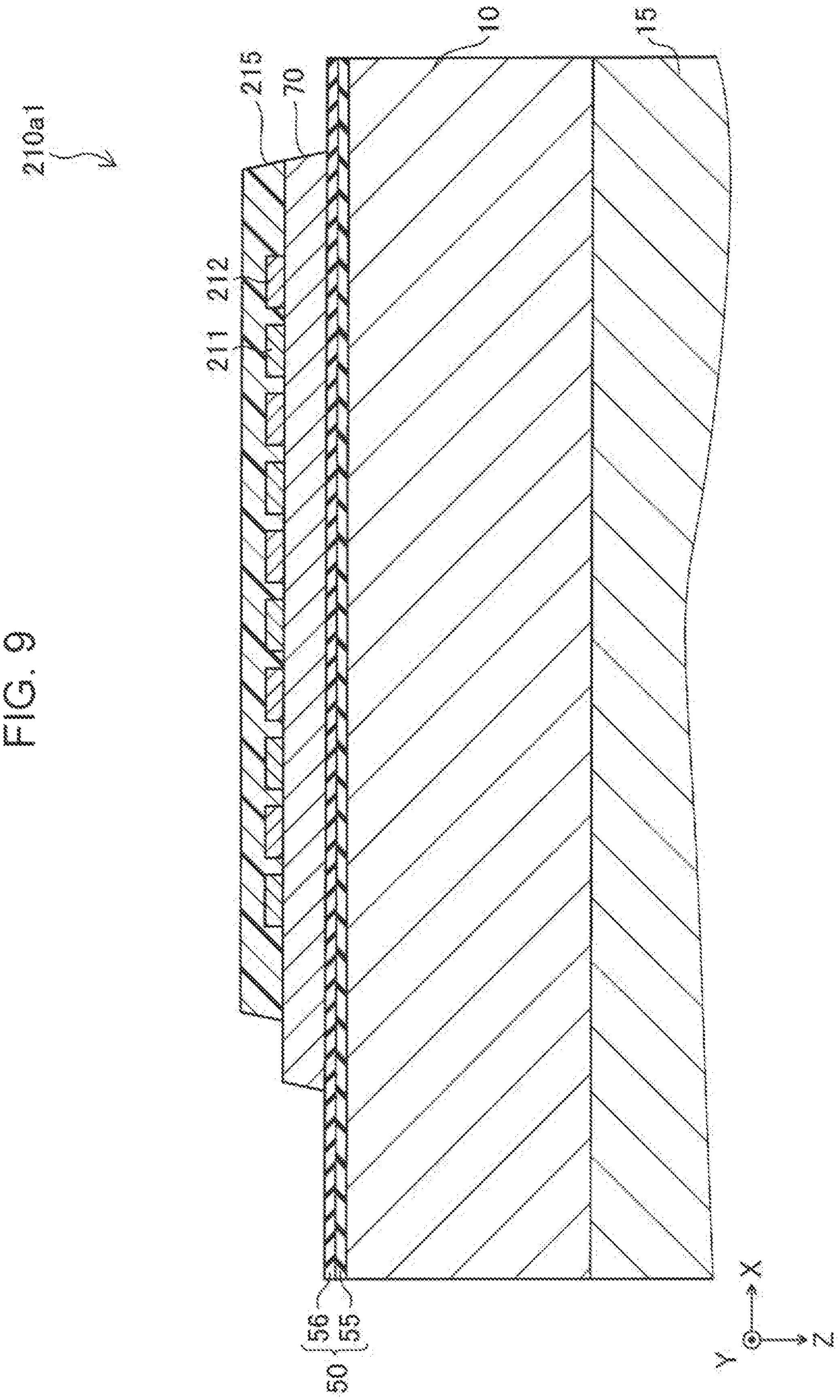
FIG. 9 is a first explanatory diagram illustrating a humidity detection section included in a liquid ejecting head according to another embodiment.

FIG. 9 is a first explanatory diagram illustrating the humidity detection section 210*al* included in the liquid ejecting head of another embodiment. The first embodiment describes an example in which the first detection electrode 211 and the second detection electrode 212 are disposed on the other side of the lamination direction with respect to the interlayer 215, that is, on the upper side of the interlayer 215. On the other hand, as in the humidity detection section 210*a*1 illustrated in FIG. 9, the first detection electrode 211 and the second detection electrode 212 may be disposed in the same layer on the lower side of the interlayer 215. Even in such a configuration, as in the first embodiment, the information on the humidity of the interlayer 215 can be detected with high accuracy, and the influence of the humidity on the piezoelectric element 300 or the member in the vicinity of the piezoelectric element 300 can be appropriately managed.

In the example of FIG. 9, the first detection electrode 211 and the second detection electrode 212 are provided on the upper side of the piezoelectric body 70, and are disposed at a boundary surface between the piezoelectric body 70 and the interlayer 215. In this case, an influence of humidity on the layer on the upper side of the boundary surface, that is, an influence of humidity on the interlayer 215 in the example of FIG. 9 can be acquired. It is considered that this is because the current flowing between the first detection electrode 211 and the second detection electrode 212 is more likely to flow to the lower surface of the interlayer 215 of which density is more likely to be lower than density of the piezoelectric body 70. It is considered that the reason why the density is likely to be lower at a position on the lower surface of the interlayer 215, that is, a position in the +Z direction from a center of the interlayer in the Z-axis direction is that the interlayer 215 which is an upper layer is likely to be influenced by a crystal structure of the piezoelectric body 70 which is a lower layer provided in advance when the interlayer 215 is laminated.

A3. Another Embodiment 2

Figure 10:
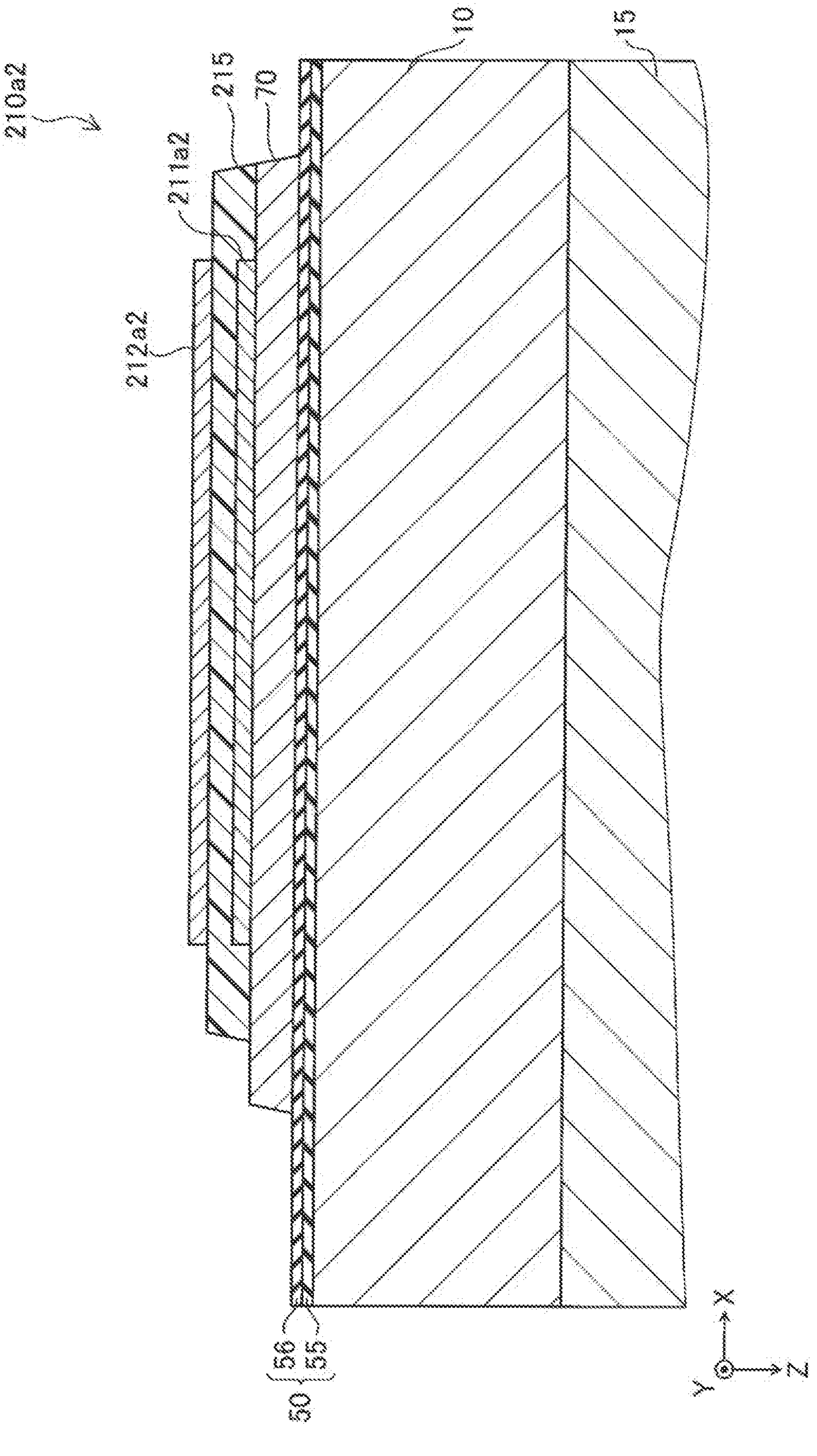
FIG. 10 is a second explanatory diagram illustrating a humidity detection section included in a liquid ejecting head according to another embodiment.

FIG. 10 is a second explanatory diagram illustrating the humidity detection section 210*a*2 included in the liquid ejecting head of another embodiment. The first embodiment describes an example in which the first detection electrode 211 and the second detection electrode 212 are disposed in the same layer. On the other hand, as in the humidity detection section 210*a*2 illustrated in FIG. 10, the first detection electrode 211*a*2 and the second detection electrode 212*a*2 may be disposed in different layers. In the example of FIG. 10, the first detection electrode 211*a*2 is disposed on the lower side of the interlayer 215, and the second detection electrode 212*a*2 is disposed on the upper side of the interlayer 215. In this case, for example, the process of forming the first detection electrode 211*a*2 is shared with the process of forming the second drive electrode 80, and the first detection electrode 211*a*2 is provided on the piezoelectric body 70. After the interlayer 215 is formed using the same material as the material of the protective film 82, the process of forming the second detection electrode 212*a*2 is shared with the process of forming the first drive wiring 91, the second drive wiring 92, the temperature detection wiring 93, or the humidity detection wiring 94, and the second detection electrode 212*a*2 is provided on the interlayer 215. With the liquid ejecting head configured as described above, by detecting interfacial resistance of the interlayer 215, information on humidity of the interlayer 215 can be detected with high accuracy.

The first embodiment describes an example in which the first detection electrode 211 and the second detection electrode 212 have a comb shape. On the other hand, as illustrated in FIG. 10, the first detection electrode 211*a*2 and the second detection electrode 212*a*2 may have shapes other than the comb shape. In the example of FIG. 10, both the first detection electrode 211*a*2 and the second detection electrode 212*a*2 are formed in a flat plate shape. The first detection electrode 211*a*2 and the second detection electrode 212*a*2 are both in contact with the interlayer 215, and are disposed so as to face each other with the interlayer 215 interposed therebetween. With the liquid ejecting head configured as described above, interfacial resistance between the interlayer 215 and the first detection electrode 211*a*2 and the second detection electrode 212*a*2 can be detected, and thus information on humidity of the interlayer 215 can be detected with high accuracy. For the first detection electrode 211*a*2 and the second detection electrode 212*a*2, various shapes for general resistance measurement can be adopted. In addition to the flat plate shape, the first detection electrode 211*a*2 and the second detection electrode 212*a*2 may have, for example, a shape in which a certain number of through holes having a certain shape are provided in a comb shape. In addition to the comb shape, a so-called zigzag shape in which the conductor zigzags may be adopted.

Since the second detection electrode 212*a*2 is formed to cover the upper surface of the interlayer 215, an exposed area of the interlayer 215 is reduced. As a result, moisture absorption and dehumidification of the interlayer 215 may be inhibited, and detection accuracy may be lowered. Therefore, from a viewpoint of suppressing inhibition of moisture absorption and dehumidification of the interlayer 215, preferably, the second detection electrode 212*a*2 is formed in a shape with an area smaller than an area of a flat plate shape, such as a comb shape, such that the upper surface of the interlayer 215 can be exposed.

B1. Second Embodiment

Figure 11:
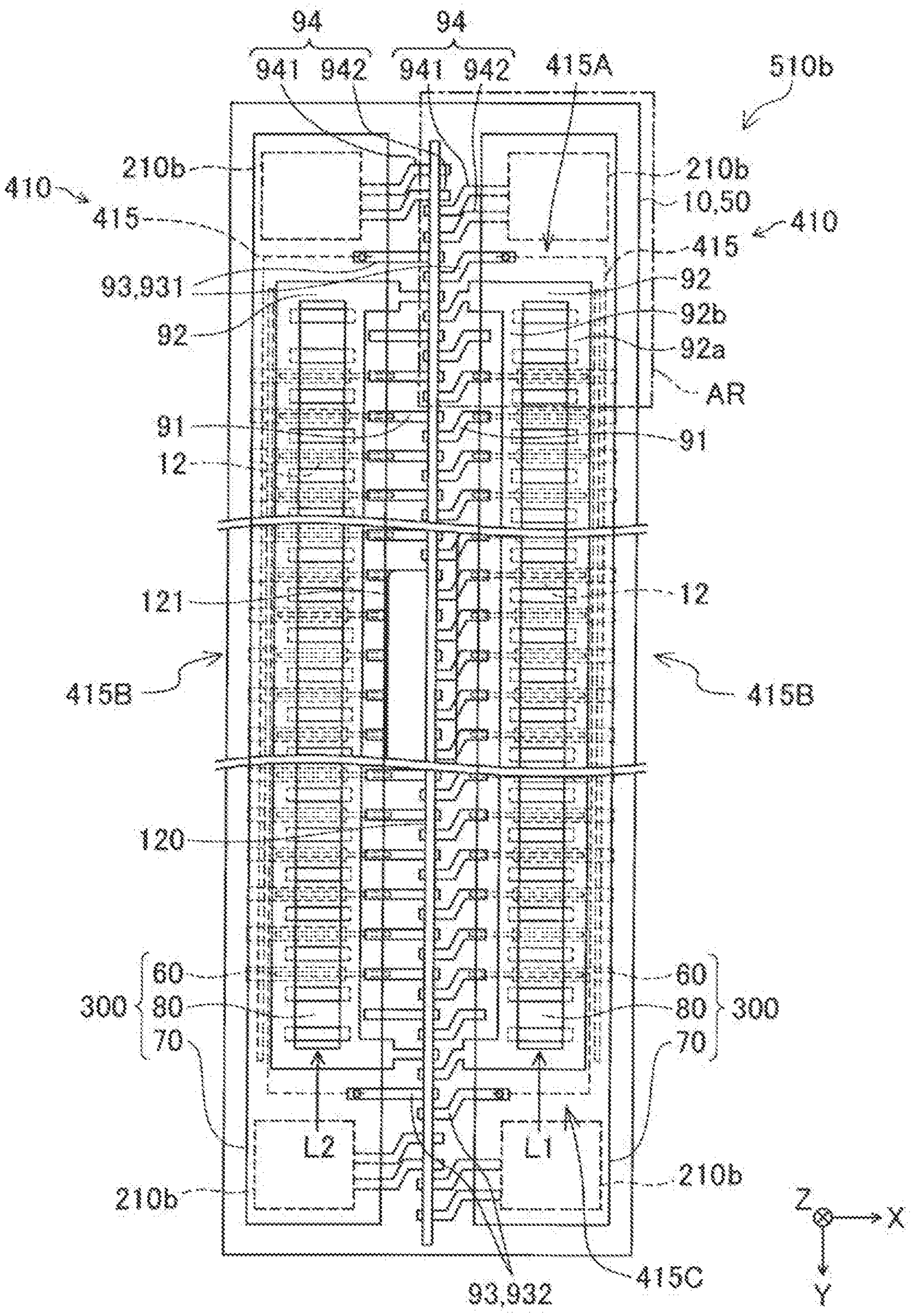
FIG. 11 is an explanatory diagram illustrating a configuration of a liquid ejecting head according to a second embodiment in plan view.

FIG. 11 is an explanatory diagram illustrating a configuration of a liquid ejecting head 510*b* according to a second embodiment of the present disclosure in plan view. The liquid ejecting head 510*b* of the present embodiment is different in that a humidity detection section 210*b* is provided instead of the humidity detection section 210, and the other configurations are the same as the configurations of the liquid ejecting head 510 of the first embodiment.

Figure 12:
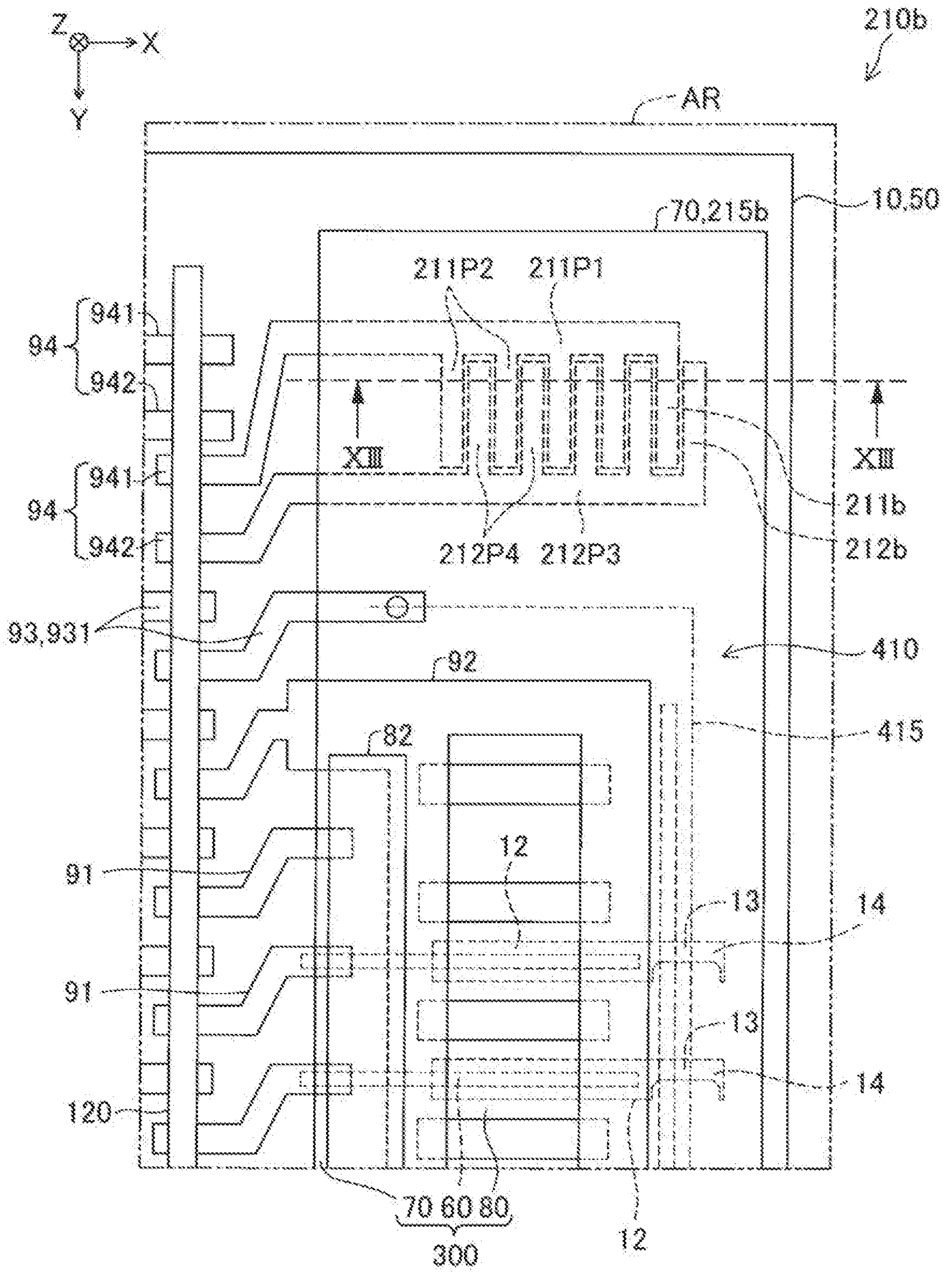
FIG. 12 is an enlarged explanatory diagram illustrating a partial range of FIG. 11.

FIG. 12 is an enlarged explanatory diagram illustrating a partial range AR of FIG. 11. The humidity detection section 210*b* is different from the humidity detection section 210 described in the first embodiment in that the material used for the interlayer is different. More specifically, in the first embodiment, the same material as the material of the protective film 82 is used for the interlayer 215. On the other hand, in the present embodiment, the same material as the material of the piezoelectric body 70 is used for the interlayer 215*b*. As illustrated in FIG. 12, the disposition position of the humidity detection section 210*b* and the shapes of the first detection electrode 211*b* and the second detection electrode 212*b* in plan view are the same as those in the first embodiment.

Figure 13:
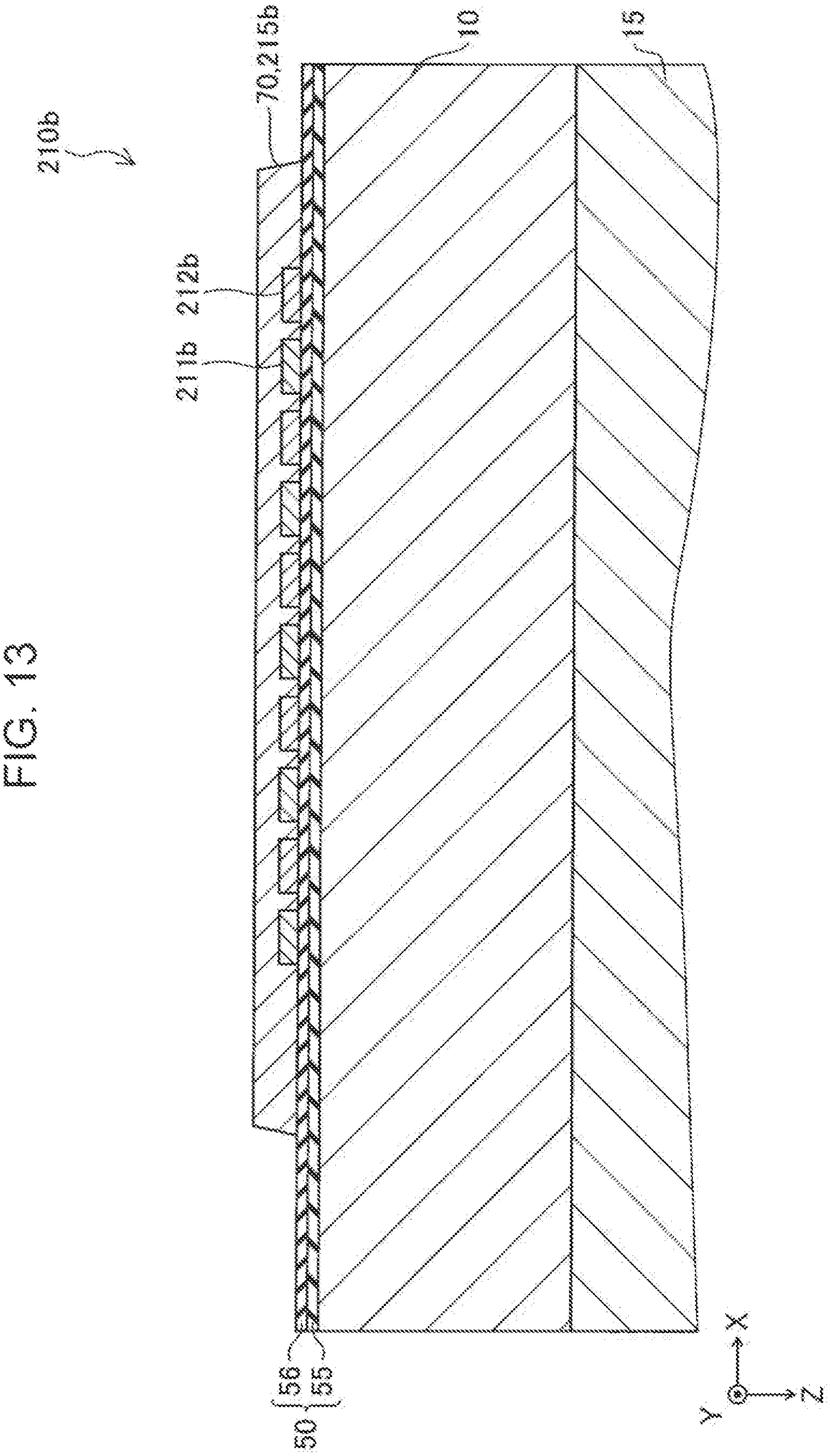
FIG. 13 is a cross-sectional view illustrating an XIII-XIII position of FIG. 12.

FIG. 13 is a cross-sectional view illustrating an XIII-XIII position of FIG. 12. As illustrated in FIG. 13, the present embodiment is different from the first embodiment in that the first detection electrode 211*b* and the second detection electrode 212*b* are disposed on the lower side of the piezoelectric body 70 which is the interlayer 215*b*. More specifically, the first detection electrode 211*b* and the second detection electrode 212*b* are provided on the vibration plate 50, and are disposed between the vibration plate 50 and the piezoelectric body 70.

In the present embodiment, the first detection electrode 211*b* and the second detection electrode 212*b* are formed of the same material as the material of the first drive electrode 60. In addition, the process of forming the first detection electrode 211*b* and the second detection electrode 212*b* is shared with the process of forming the first drive electrode 60, and when forming the first drive electrode 60 at the vibration plate 50, the first detection electrode 211*b* and the second detection electrode 212*b* are also formed. After the first detection electrode 211*b* and the second detection electrode 212*b* are formed, the piezoelectric body 70 is laminated in a range including the first detection electrode 211*b* and the second detection electrode 212*b*.

The first detection electrode 211*b* and the second detection electrode 212*b* are not limited to being disposed on the lower side of the piezoelectric body 70, and can be disposed on the upper surface of the piezoelectric body 70 in a state of being exposed. In this case, the process of forming the first detection electrode 211*b* and the second detection electrode 212*b* may be shared with the process of forming the second drive electrode 80, and the first detection electrode 211*b* and the second detection electrode 212*b* can be formed together with the second drive electrode 80 after the piezoelectric body 70 is formed.

As described above, the liquid ejecting head 510*b* of the second embodiment includes the piezoelectric body 70 which is laminated on the vibration plate 50, of which the resistance changes according to humidity, and which is the interlayer 215*b*. With the liquid ejecting head 510*b* configured as described above, the information on humidity of the piezoelectric body 70 can be detected with high accuracy, and thus an influence of the humidity on the piezoelectric element 300 can be appropriately managed.

With the liquid ejecting head 510*b* of the present embodiment, the first detection electrode 211*b* and the second detection electrode 212*b* are formed of the same material as the material of the first drive electrode 60. With the configuration, the process of forming the first detection electrode 211*b* and the second detection electrode 212*b* can be shared with the process of forming the first drive electrode 60, and thus productivity of the liquid ejecting head 510*b* can be improved.

With the liquid ejecting head 510*b* of the present embodiment, the first detection electrode 211*b* and the second detection electrode 212*b* are disposed in the same layer on the lower side of the interlayer 215 which is formed of the same material as the material of the piezoelectric body 70. By forming the first detection electrode 211*b* and the second detection electrode 212*b* in the same layer, the process of forming the first detection electrode 211*b* and the process of forming the second detection electrode 212*b* can be easily shared. Further, by forming the first detection electrode 211*b* and the second detection electrode 212*b* on the lower side of the piezoelectric body 70, the process of forming the first detection electrode 211*b* and the second detection electrode 212*b* can be easily shared with the process of forming the first drive electrode 60.

B2. Another Embodiment

Figure 14:
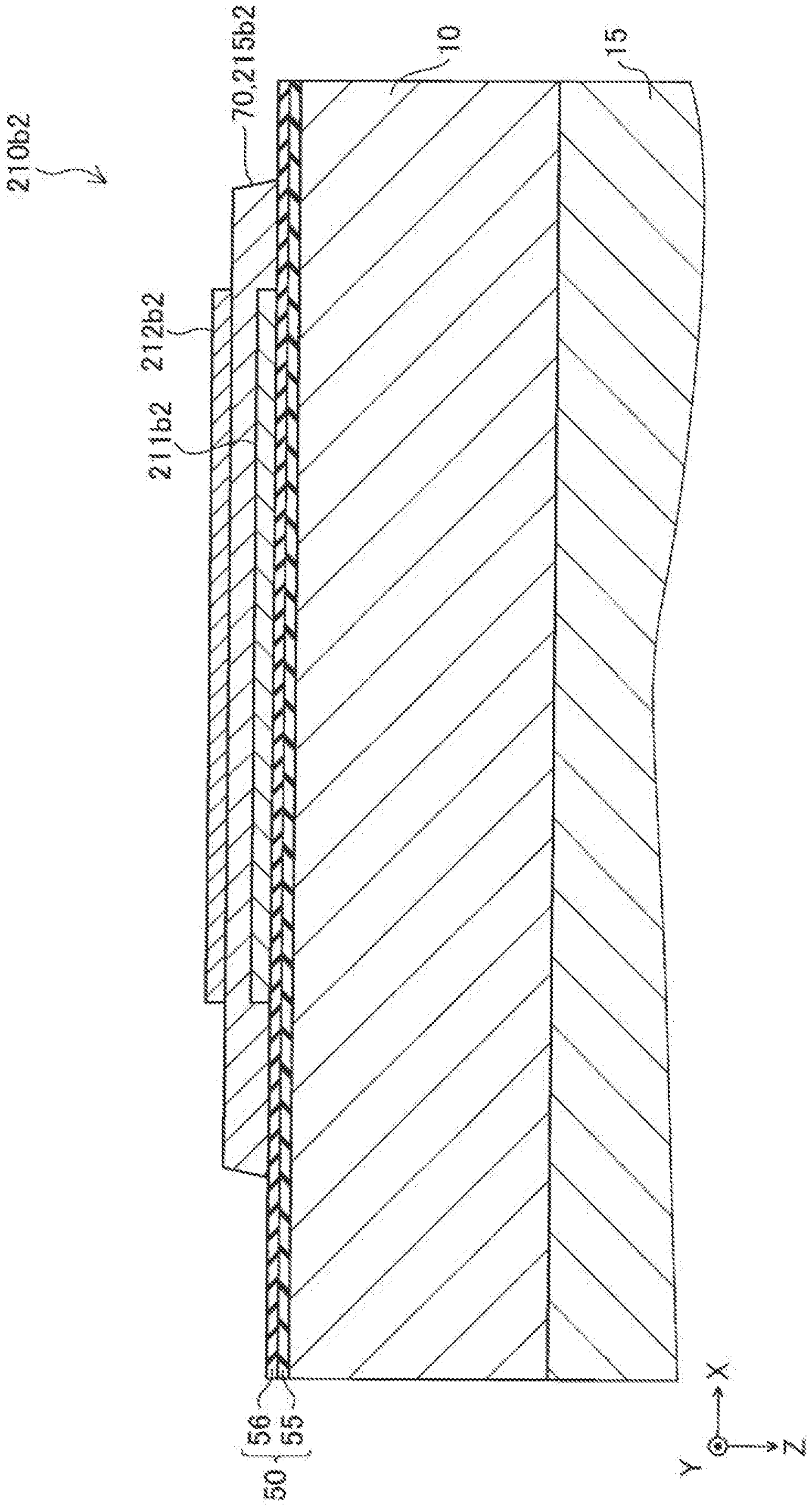
FIG. 14 is a third explanatory diagram illustrating a humidity detection section included in a liquid ejecting head according to another embodiment.

FIG. 14 is a third explanatory diagram illustrating the humidity detection section 210*b*2 included in the liquid ejecting head of another embodiment. The second embodiment describes an example in which the first detection electrode 211*b* and the second detection electrode 212*b* are disposed in the same layer on the lower side of the piezoelectric body 70. On the other hand, as in the humidity detection section 210*b*2 illustrated in FIG. 14, the first detection electrode 211*b*2 and the second detection electrode 212*b*2 may be disposed in different layers. In the example of FIG. 14, the first detection electrode 211*b*2 has a flat plate shape, and is disposed on the lower side of the piezoelectric body 70 which serves as the interlayer 215. The second detection electrode 212*b*2 has a flat plate shape, and is disposed on the upper side of the piezoelectric body 70. With the liquid ejecting head configured as described above, by detecting interfacial resistance of the piezoelectric body 70, an influence of humidity on the piezoelectric body 70 can be appropriately managed. In addition, for example, the process of forming the first detection electrode 211*b*2 can be shared with the process of forming the first drive electrode 60. Further, the process of forming the second detection electrode 212*b*2 can be shared with the process of forming the second drive electrode 80 after the piezoelectric body 70 is coated. From a viewpoint of suppressing inhibition of moisture absorption of the piezoelectric body 70 which serves as the interlayer 215*b*, preferably, the second detection electrode 212*b*2 is formed in a shape with an area smaller than an area of a flat plate shape, such as a comb shape, such that the upper surface of the piezoelectric body 70 is exposed.

C1. Third Embodiment

Figure 15:
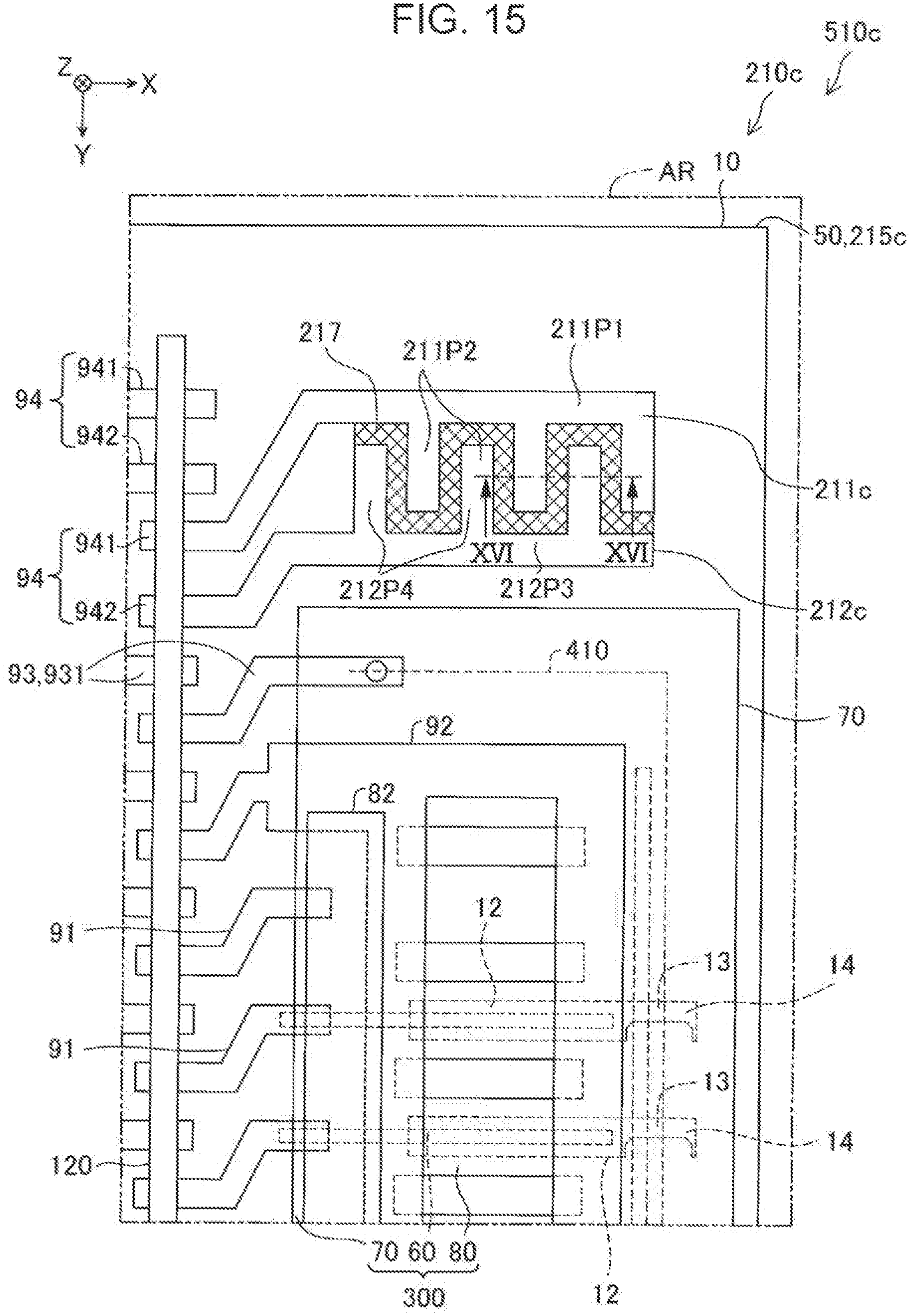
FIG. 15 is an explanatory diagram illustrating a configuration of a liquid ejecting head according to a third embodiment in plan view.

FIG. 15 is an explanatory diagram illustrating a configuration of a liquid ejecting head 510*c* according to a third embodiment of the present disclosure in plan view. The liquid ejecting head 510*c* of the present embodiment is different in that a humidity detection section 210*c* is provided instead of the humidity detection section 210, and the other configurations are the same as the configurations of the liquid ejecting head 510 of the first embodiment.

The humidity detection section 210*c* is different from the humidity detection section 210 described in the first embodiment in that a material used for the interlayer 215*c* is different and that an insulating portion 217 is further provided. In FIG. 15, in order to facilitate understanding of the technique, the insulating portion 217 is hatched. In the present embodiment, the same material as the material of the vibration plate 50 is used for the interlayer 215*c*. As illustrated in FIG. 15, the disposition position of the humidity detection section 210*c* in plan view is the same as the disposition position in the first embodiment.

Figure 16:
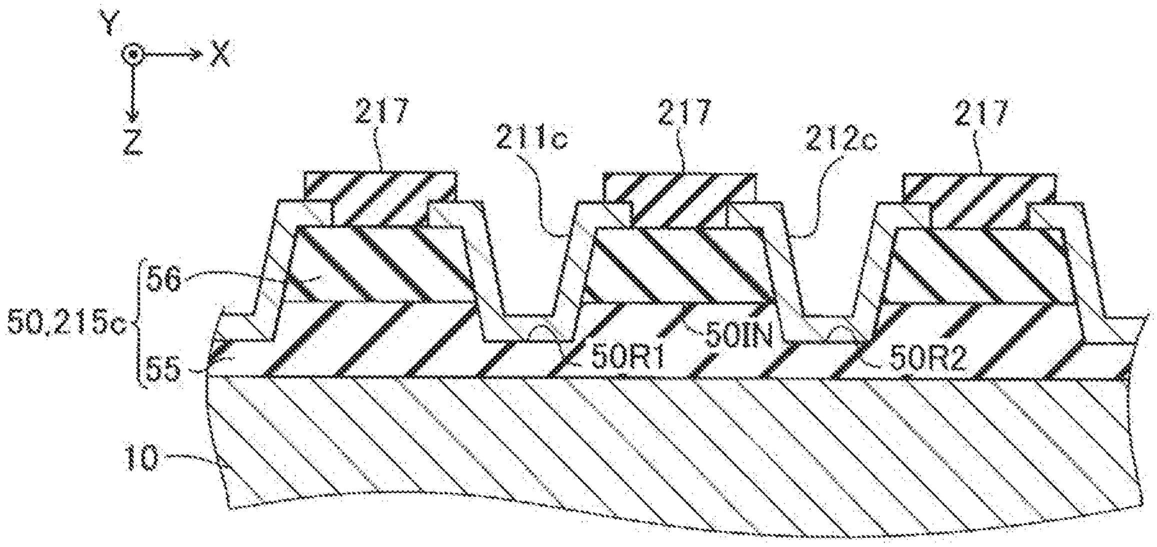
FIG. 16 is a cross-sectional view illustrating an XVI-XVI position of FIG. 15.

FIG. 16 is a cross-sectional view illustrating an XVI-XVI position of FIG. 15. The interlayer 215*c* includes a first interlayer, a second interlayer laminated on the first interlayer, and a boundary surface between the first interlayer and the second interlayer. In the present embodiment, assuming that the elastic film 55 of the vibration plate 50 is referred to as a "first layer" and the insulator film 56 laminated on the elastic film 55 is referred to as a "second layer", the first layer functions as the first interlayer, and the second layer functions as the second interlayer.

As illustrated in FIG. 16, the first detection electrode 211*c* and the second detection electrode 212*c* are disposed at recessed portions 50R1 and 50R2 formed in the vibration plate 50 which serves as the interlayer 215*c*. The recessed portion 50R1 corresponds to a formation position of the first detection electrode 211*c*, and the recessed portion 50R2 corresponds to a formation position of the second detection electrode 212*c*. In plan view, the first detection electrode 211*c* and the second detection electrode 212*c* are formed so as to have a comb shape illustrated in FIG. 15.

As illustrated in FIG. 16, in a cross-sectional view, the recessed portions 50R1 and 50R2 are deeper than a boundary surface 50IN between the elastic film 55 and the insulator film 56, and are formed by, for example, etching the vibration plate 50 from the surface of the elastic film 55 to a part of the insulator film 56 by ion milling or the like. The first detection electrode 211*c* and the second detection electrode 212*c* are disposed in the recessed portions 50R1 and 50R2 on both sides of the boundary surface 50IN so as to be in contact with the boundary surface 50IN, and detect resistance of the boundary surface 50IN. Thereby, information on humidity of the insulator film 56 which is the upper layer of the vibration plate 50 can be detected with high accuracy.

In the present embodiment, the first detection electrode 211*c* and the second detection electrode 212*c* are formed of the same material as the material of the second drive electrode 80. For example, the humidity detection section 210*c* is provided on the exposed vibration plate 50 obtained by forming a film of the piezoelectric body 70 once and removing the film by etching. Therefore, the process of forming the first detection electrode 211*c* and the second detection electrode 212*c* can be shared with the process of forming the second drive electrode 80 that is a process after a film of the piezoelectric body 70 is formed, and thus productivity can be increased. Here, the present disclosure is not limited thereto. The first detection electrode 211*c* and the second detection electrode 212*c* may be formed in the process of forming the first drive electrode 60 before the piezoelectric body 70 is formed, and may be formed in another process such as the process of forming the first drive wiring 91, the second drive wiring 92, the temperature detection wiring 93, the humidity detection wiring 94, or the like.

The insulating portion 217 is disposed between the first detection electrode 211*c* and the second detection electrode 212*c* on an upper surface of the insulator film 56. As a material of the insulating portion 217, a material having an electrical insulating property and a moisture barrier property is used. Thereby, short circuit between the first detection electrode 211*c* and the second detection electrode 212*c* on the surface of the insulator film 56 is suppressed or prevented. The insulating portion 217 can be formed of the same material as the material of the protective film 82, for example, an oxide insulating film such as aluminum oxide or Hafnia, or a polymer material film such as polyimide. When the insulating portion 217 is a photosensitive resin such as polyimide, a resist layer used in a manufacturing process can be used. When the first detection electrode 211*c* and the second detection electrode 212*c* are sufficiently insulated, the insulating portion 217 may be omitted.

As described above, with the liquid ejecting head 510*c* of the third embodiment, the interlayer 215*c* includes the first interlayer, the second interlayer laminated on the first interlayer, and the boundary surface between the first interlayer and the second interlayer. The boundary surface is disposed between the first detection electrode 211 and the second detection electrode 212. Therefore, even when the interlayer 215*c* is formed by laminating two layers, by acquiring the resistance of the boundary surface of the interlayer 215*c*, an influence of humidity on the interlayer 215*c* can be appropriately managed.

With the liquid ejecting head 510*c* of the present embodiment, the interlayer 215*c* is formed of the same material as the material of the vibration plate 50. Thus, information on humidity of the vibration plate 50 can be detected with high accuracy. Therefore, an influence of humidity on the vibration plate 50 can be appropriately managed.

With the liquid ejecting head 510*c* of the present embodiment, the vibration plate 50 includes a first layer, a second layer laminated on the first layer, and a boundary surface 50IN between the first layer and the second layer. The boundary surface 50IN is disposed between the first detection electrode 211 and the second detection electrode 212. Therefore, even when the vibration plate 50 is formed by laminating two layers, by acquiring the resistance of the boundary surface 50IN of the vibration plate 50, an influence of humidity on the vibration plate 50 can be appropriately managed.

C2. Another Embodiment

Figure 17:
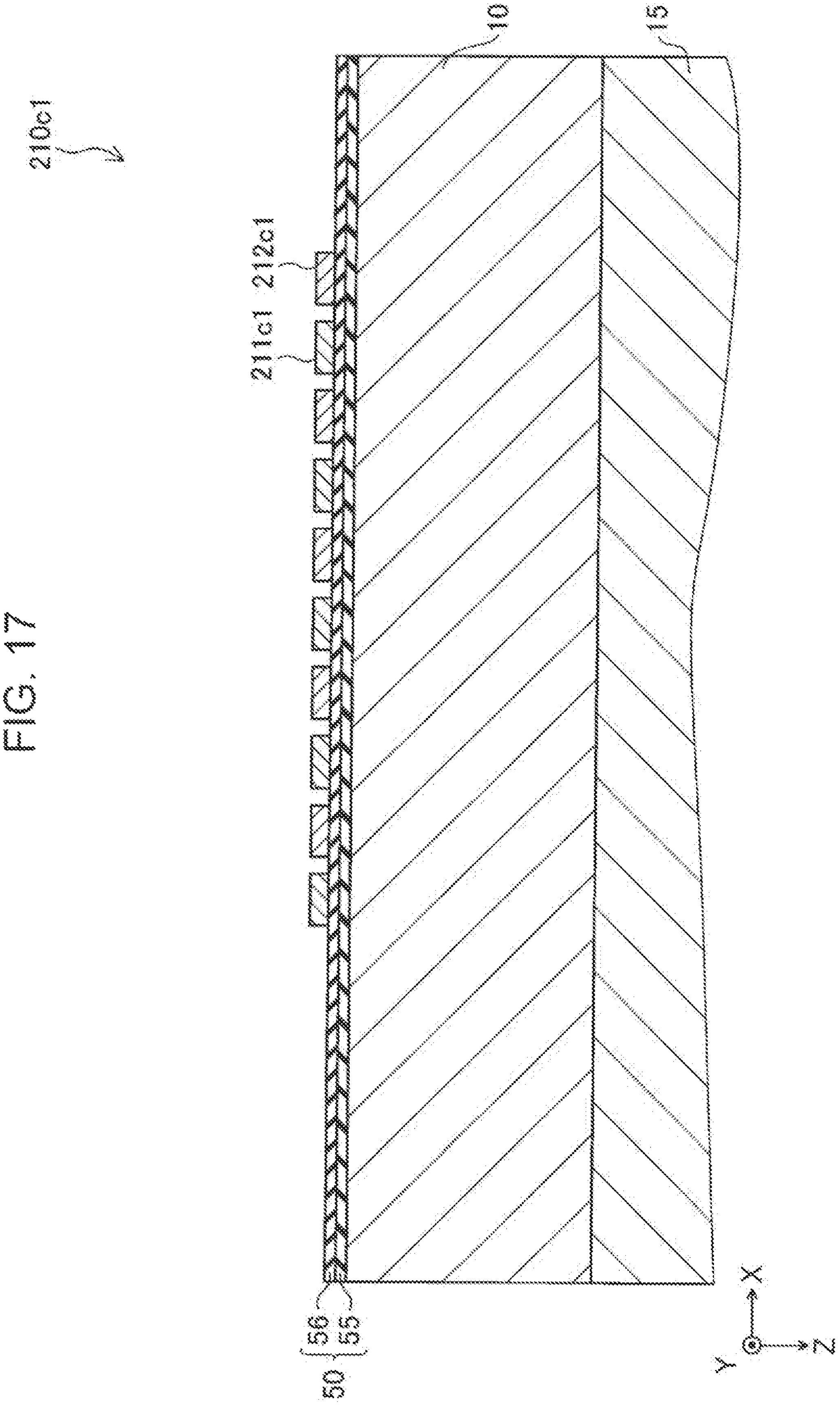
FIG. 17 is a fourth explanatory diagram illustrating a humidity detection section included in a liquid ejecting head according to another embodiment.

FIG. 17 is a fourth explanatory diagram illustrating the humidity detection section 210*cl* included in the liquid ejecting head of another embodiment. The third embodiment describes an example in which the first detection electrode 211*c* and the second detection electrode 212*c* are disposed in the recessed portions 50R1 and 50R2 formed in the vibration plate 50. On the other hand, as illustrated in FIG. 17, the first detection electrode 211*c*1 and the second detection electrode 212*c*1 may be disposed on the upper side of the vibration plate 50 without providing the recessed portions 50R1 and 50R2 in the vibration plate 50. With such a configuration, the resistance of the surface of the insulator film 56 of the vibration plate 50 can be detected. With the liquid ejecting head of the embodiment, information on humidity of the insulator film 56 can be detected with high accuracy by a simple method of detecting resistance of the upper surface of the vibration plate 50, and thus an influence of humidity on the insulator film 56 can be appropriately managed. The first detection electrode 211*c*1 and the second detection electrode 212*c*1 may be disposed on the lower side of the vibration plate 50.

Figure 18:
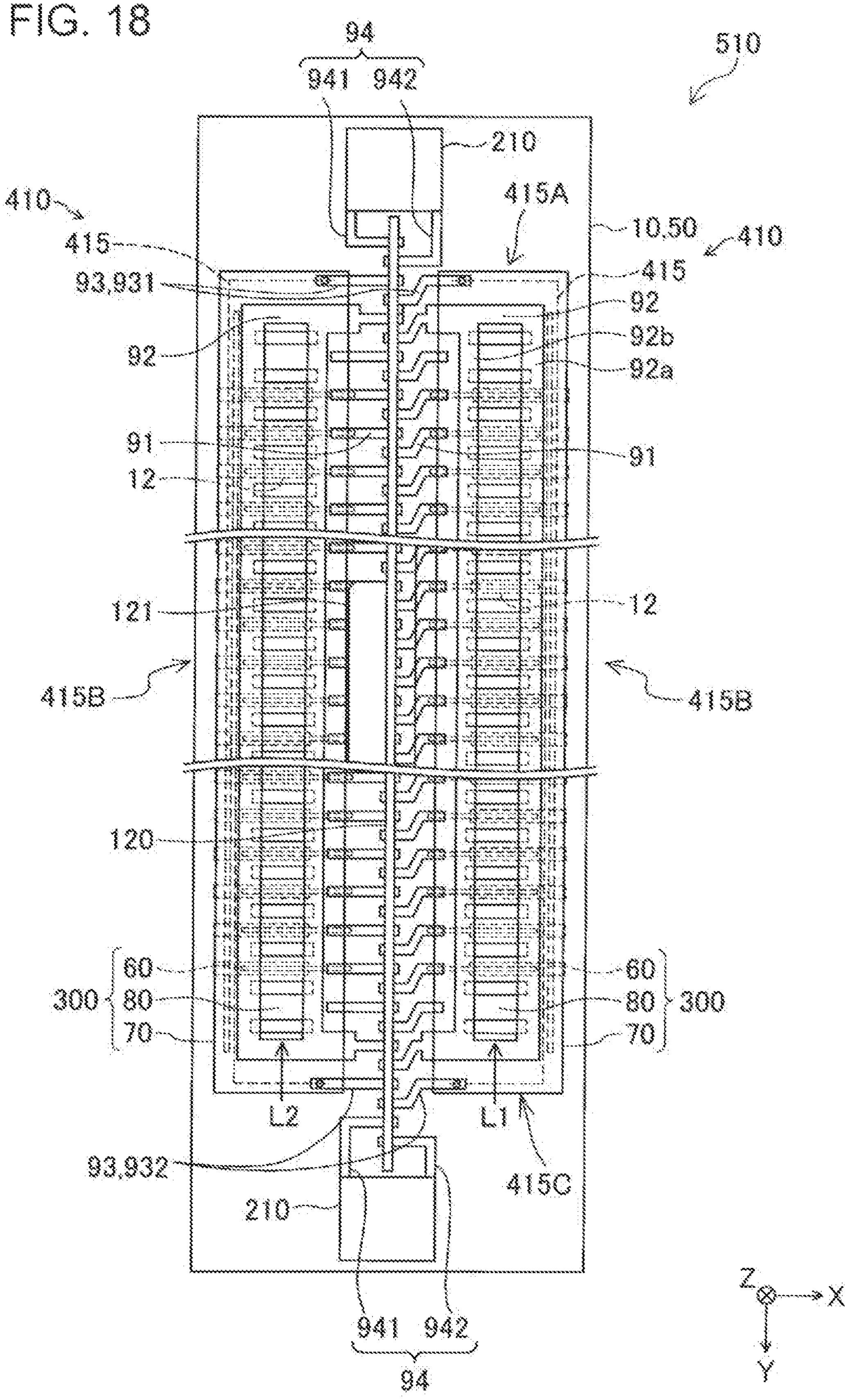
FIG. 18 is a first explanatory diagram illustrating another disposition example of the humidity detection section.

D. Another Embodiment (D1) FIG. 18 is a first explanatory diagram illustrating another disposition example of the humidity detection section. Each of the embodiments describes an example in which, in plan view, the humidity detection sections are disposed at total four positions including positions adjacent to both sides of the first pressure chamber row L1 along the first arrangement direction and positions adjacent to both sides of the second pressure chamber row L2 along the second arrangement direction. On the other hand, as illustrated in FIG. 18, for example, the humidity detection sections 210 may be disposed at positions adjacent to both sides of the wiring substrate 120 along the Y-axis direction which is the first arrangement direction. Alternatively, the humidity detection sections 210 may be disposed only at a position adjacent to any one side of the wiring substrate 120 along the Y-axis direction. With the liquid ejecting head 510 configured as described above, by disposing the humidity detection section 210 at a position separated from the piezoelectric element 300, an influence of noise of the drive signal of the piezoelectric element 300 on the humidity detection section 210 can be reduced. Further, for example, when one holding portion 31 common to a plurality of pressure chamber rows such as the first pressure chamber row L1 and the second pressure chamber row L2 is provided, the number of the humidity detection sections 210 can be reduced, and thus information on humidity can be efficiently acquired.

Figure 19:
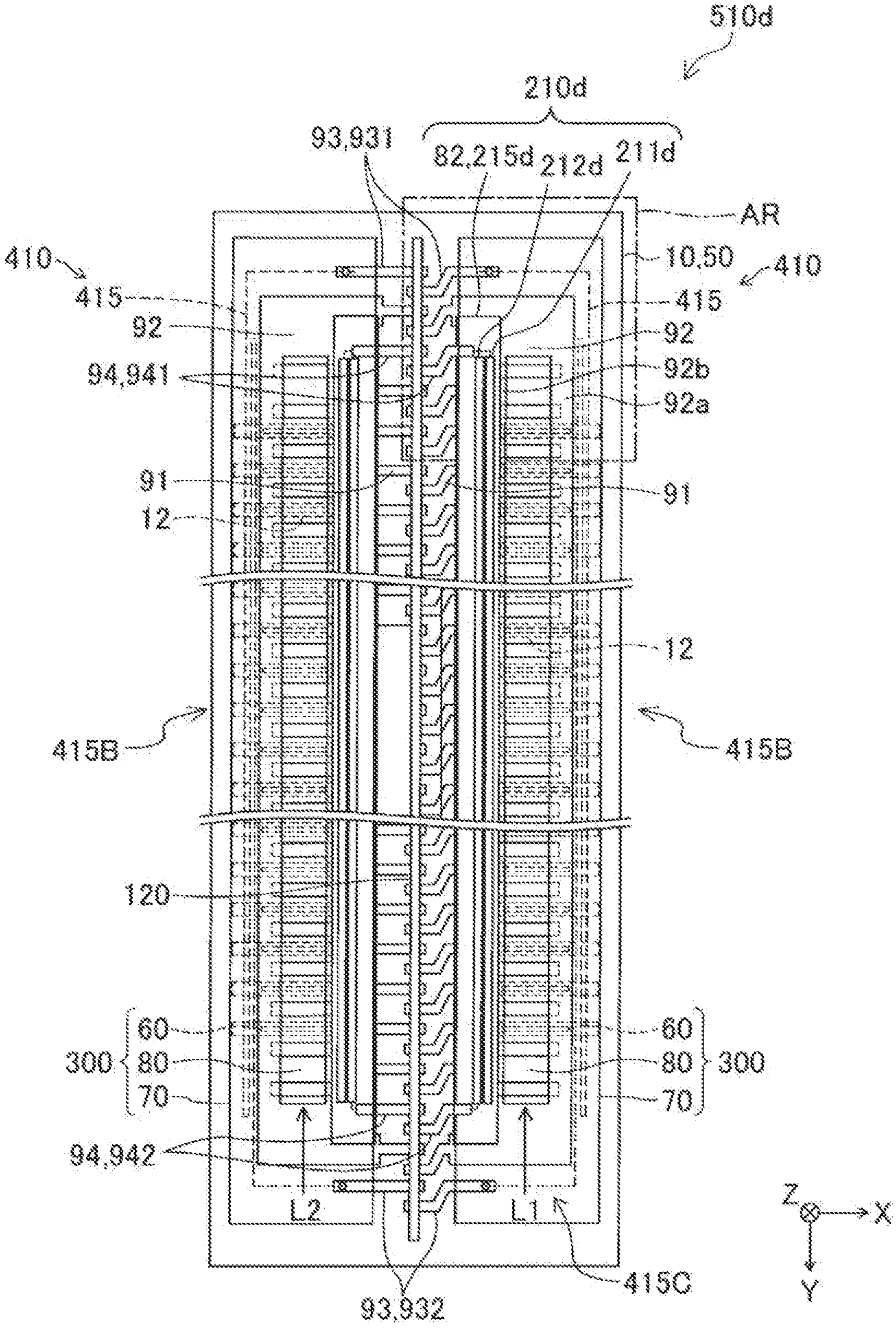
FIG. 19 is a second explanatory diagram illustrating another disposition example of the humidity detection section.

(D2) FIG. 19 is a second explanatory diagram illustrating another disposition example of the humidity detection section. As illustrated in FIG. 19, the humidity detection section 210*d* may be provided on the protective film 82 that is disposed to cover the end portion 80*b* and the surface of the piezoelectric body 70 at the drive electrode end portion position overlapping the end portion 80*b* of the second drive electrode 80. In this case, the protective film 82 functions as the interlayer 215*d*. As illustrated in FIG. 19, the first humidity detection wiring 941 and the second humidity detection wiring 942 are disposed at positions that face each other with the plurality of first drive wirings 91 interposed therebetween and are on the inner side of the liquid ejecting head 510*d* with respect to the second drive wiring 92.

Figure 20:
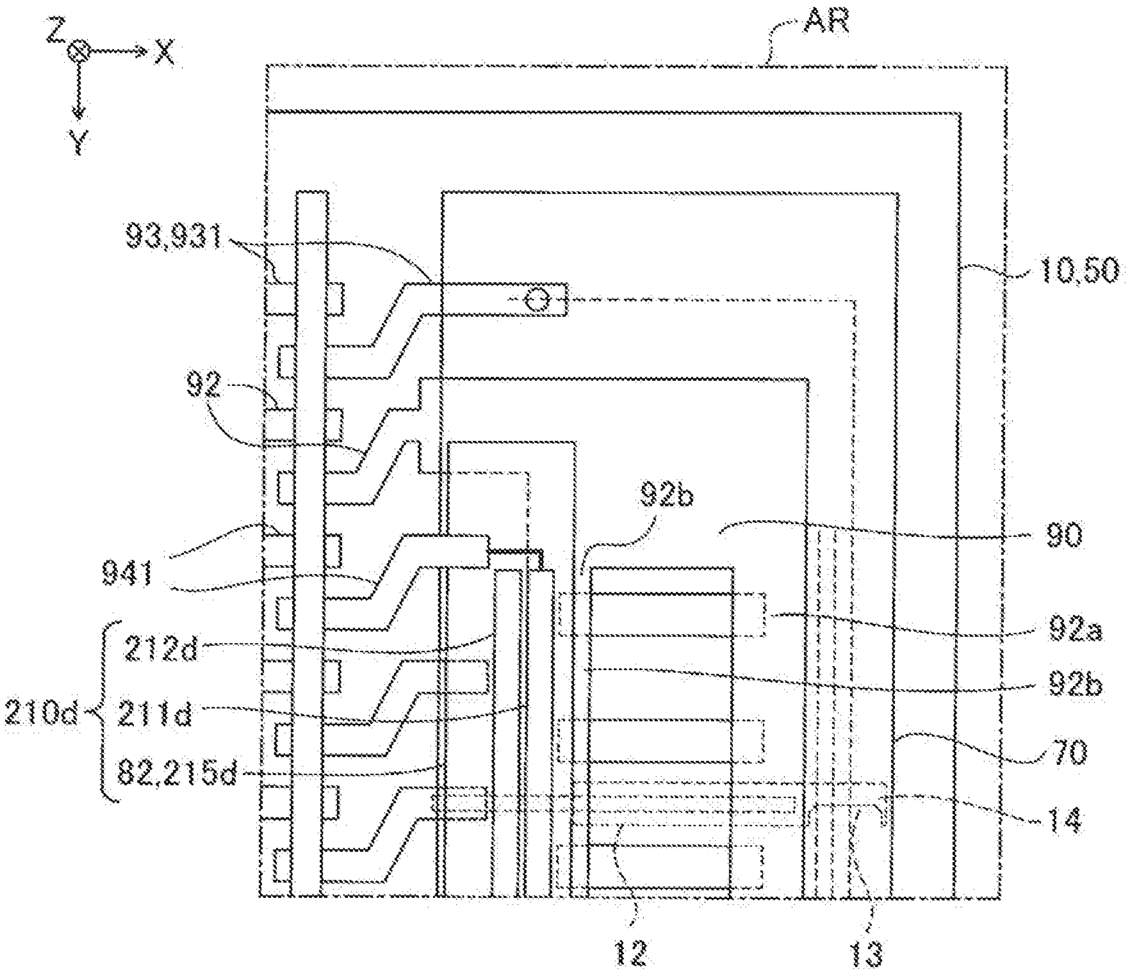
FIG. 20 is an enlarged explanatory diagram illustrating a partial range of FIG. 19.

FIG. 20 is an enlarged explanatory diagram illustrating a partial range AR of FIG. 19. As illustrated in FIG. 20, the first detection electrode 211*d* and the second detection electrode 212*d* are disposed on the upper surface of the protective film 82 so as to face each other. With the liquid ejecting head 510*d* configured as described above, the same effect as that of the first embodiment can be obtained, and by using the existing protective film 82 as the interlayer 215*d*, an increase in the number of components because of installation of the humidity detection section 210*d* can be suppressed. Although detailed illustration of the shapes of the first detection electrode 211*d* and the second detection electrode 212*d* is omitted, any shape such as a linear shape, a flat plate shape, and a comb shape described above can be used.

E. Other Aspects

The present disclosure is not limited to the above-described embodiments, and can be realized in various configurations without departing from the gist of the present disclosure. For example, technical features in the embodiments corresponding to technical features in respective aspects described in outline of the present disclosure can be appropriately replaced or combined in order to solve some or all of the above-described problems or achieve some or all of the above-described effects. Further, as long as the technical feature is not described as essential in the present specification, the technical feature can be appropriately deleted.

(1) According to one aspect of the present disclosure, a liquid ejecting head is provided. A liquid ejecting head includes: a piezoelectric element that includes a first drive electrode, a second drive electrode, and a piezoelectric body, the piezoelectric body being provided between the first drive electrode and the second drive electrode in a lamination direction in which the first drive electrode, the second drive electrode, and the piezoelectric body are laminated; a vibration plate that is provided on one side of the lamination direction with respect to the piezoelectric element and is deformed by driving of the piezoelectric element; a pressure chamber substrate that is provided on the one side of the lamination direction with respect to the vibration plate and is provided with a plurality of pressure chambers; an interlayer that is laminated on at least one of the piezoelectric body, the vibration plate, or the pressure chamber substrate and of which resistance changes according to humidity; a first detection electrode that is in contact with the interlayer; and a second detection electrode that is in contact with the interlayer and faces the first detection electrode.

With the liquid ejecting head according to the aspect, by using the resistance between the first detection electrode and the second detection electrode, information on humidity of the interlayer provided in the piezoelectric element or a member in the vicinity of the piezoelectric element can be detected with high accuracy. Therefore, an influence of humidity on the piezoelectric element or the member in the vicinity of the piezoelectric element can be appropriately acquired.

(2) In the liquid ejecting head according to the aspect, the first detection electrode and the second detection electrode may be disposed on a surface of the interlayer, and a part of the surface of the interlayer may be exposed between the first detection electrode and the second detection electrode.

With the liquid ejecting head according to the aspect, the resistance of the surface of the interlayer can be detected, and thus information on humidity of the interlayer can be detected with high accuracy.

(3) In the liquid ejecting head according to the aspect, the interlayer may include a first interlayer and a second interlayer laminated on the first interlayer, and a boundary surface between the first interlayer and the second interlayer may be disposed between the first detection electrode and the second detection electrode.

With the liquid ejecting head according to the aspect, even when the interlayer is formed by laminating a plurality of layers, by acquiring the resistance of the boundary surface of the interlayer, information on humidity of the interlayer can be detected with high accuracy.

(4) According to another aspect of the present disclosure, a liquid ejecting apparatus is provided. A liquid ejecting apparatus includes: the liquid ejecting head according to the aspect; a resistance measurement section that measures resistance between the first detection electrode and the second detection electrode; and a humidity management section that acquires information on humidity of the interlayer by using the resistance which is measured by the resistance measurement section.

With the liquid ejecting apparatus according to the aspect, the liquid ejecting apparatus that can appropriately manage information on the humidity in the member in the liquid ejecting head can be provided.

(5) In the liquid ejecting head according to the aspect, at least one of the first detection electrode and the second detection electrode may be formed of the same material as a material of the first drive electrode.

With the liquid ejecting head according to the aspect, the process of forming at least one of the first detection electrode and the second detection electrode can be shared with the process of forming the first drive electrode, and thus productivity of the liquid ejecting head can be improved.

(6) In the liquid ejecting head according to the aspect, at least one of the first detection electrode and the second detection electrode may be formed of the same material as a material of the second drive electrode.

With the liquid ejecting head according to the aspect, the process of forming at least one of the first detection electrode and the second detection electrode can be shared with the process of forming the second drive electrode, and thus productivity of the liquid ejecting head can be improved.

(7) The liquid ejecting head according to the aspect may further include at least a protective film that is disposed at a position on another side of the lamination direction with respect to the pressure chamber substrate and contains a resin material, the other side of the lamination direction being a side of the lamination direction opposite to the one side on which the vibration plate is provided. The interlayer may be formed of the same material as a material of the protective film.

With the liquid ejecting head according to the aspect, by forming the interlayer using a resin material of which surface resistance is likely to change according to humidity, accuracy of detection of the information on humidity can be improved.

(8) In the liquid ejecting head according to the aspect, the first detection electrode and the second detection electrode may be disposed in the same layer on one side of the lamination direction or the other side of the lamination direction with respect to the interlayer.

With the liquid ejecting head according to the aspect, by forming the first detection electrode and the second detection electrode in the same layer, the process of forming the first detection electrode and the process of forming the second detection electrode can be easily shared.

(9) In the liquid ejecting head according to the aspect, the first detection electrode may be disposed on the one side of the lamination direction with respect to the interlayer, and the second detection electrode may be disposed on the other side of the lamination direction with respect to the interlayer.

With the liquid ejecting head according to the aspect, by detecting interfacial resistance of the interlayer, information on humidity of the interlayer can be detected with high accuracy.

(10) In the liquid ejecting head according to the aspect, in plan view of the liquid ejecting head in the lamination direction, the protective film may be disposed at a drive electrode end portion position overlapping an end portion of the first drive electrode or an end portion of the second drive electrode, and the first detection electrode and the second detection electrode may be disposed in the same layer on the one side of the lamination direction or the other side of the lamination direction with respect to the protective film that is disposed at the drive electrode end portion position and serves as the interlayer.

With the liquid ejecting head according to the aspect, by using, as the interlayer, the protective film disposed at the drive electrode end portion position, an increase in the number of components because of installation of the humidity detection section can be suppressed.

(11) In the liquid ejecting head according to the aspect, the interlayer may be formed of the same material as a material of the piezoelectric body.

With the liquid ejecting head according to the aspect, information on humidity of the piezoelectric body can be detected with high accuracy, and thus an influence of the humidity on the piezoelectric body can be appropriately acquired.

(12) In the liquid ejecting head according to the aspect, the first detection electrode and the second detection electrode may be disposed in the same layer on the one side of the lamination direction or the other side of the lamination direction with respect to the interlayer, the other side of the lamination direction being a side of the lamination direction opposite to the one side.

With the liquid ejecting head according to the aspect, by forming the first detection electrode and the second detection electrode in the same layer, the process of forming the first detection electrode and the process of forming the second detection electrode can be easily shared.

(13) In the liquid ejecting head according to the aspect, the first detection electrode may be disposed on the one side of the lamination direction with respect to the interlayer, and the second detection electrode may be disposed on the other side of the lamination direction with respect to the interlayer, the other side of the lamination direction being a side of the lamination direction opposite to the one side.

With the liquid ejecting head according to the aspect, by detecting interfacial resistance of the piezoelectric body, information on humidity of the piezoelectric body can be detected with high accuracy.

(14) In the liquid ejecting head according to the aspect, the interlayer may be formed of the same material as a material of the vibration plate.

With the liquid ejecting head according to the aspect, information on humidity of the vibration plate can be detected with high accuracy, and thus an influence of the humidity on the vibration plate can be appropriately acquired.

(15) In the liquid ejecting head according to the aspect, the first detection electrode and the second detection electrode may be disposed in the same layer on the one side of the lamination direction or the other side of the lamination direction with respect to the interlayer, the other side of the lamination direction being a side of the lamination direction opposite to the one side.

With the liquid ejecting head according to the aspect, by forming the first detection electrode and the second detection electrode in the same layer, the process of forming the first detection electrode and the process of forming the second detection electrode can be easily shared.

(16) In the liquid ejecting head according to the aspect, the vibration plate may include a first layer and a second layer laminated on the first layer, and a boundary surface between the first layer and the second layer may be disposed between the first detection electrode and the second detection electrode.

With the liquid ejecting head according to the aspect, even when the vibration plate is formed by laminating a plurality of layers, by acquiring the resistance of the boundary surface of the vibration plate, information on humidity of the vibration plate can be detected with high accuracy.

(17) In the liquid ejecting head according to the aspect, in plan view of the liquid ejecting head in the lamination direction, the plurality of pressure chambers may be arranged in a first pressure chamber row along a first arrangement direction and in a second pressure chamber row along a second arrangement direction parallel to the first arrangement direction, and the interlayer, the first detection electrode, and the second detection electrode may be disposed at at least one position of positions adjacent to the first pressure chamber row along the first arrangement direction and positions adjacent to the second pressure chamber row along the second arrangement direction.

With the liquid ejecting head according to the aspect, the humidity detection sections can be individually provided for each of the first pressure chamber row and the second pressure chamber row, and thus information on humidity for each pressure chamber row can be acquired with high accuracy.

(18) In the liquid ejecting head according to the aspect, in plan view of the liquid ejecting head in the lamination direction, the plurality of pressure chambers may be arranged in a first pressure chamber row along a first arrangement direction and in a second pressure chamber row along a second arrangement direction parallel to the first arrangement direction, a wiring substrate that is electrically coupled to the liquid ejecting head may be disposed between the first pressure chamber row and the second pressure chamber row, and the interlayer, the first detection electrode, and the second detection electrode may be disposed at positions adjacent to the wiring substrate along the first arrangement direction.

With the liquid ejecting head according to the aspect, by disposing the humidity detection section at a position separated from the piezoelectric element, an influence of noise of the drive signal of the piezoelectric element on the humidity detection section can be reduced.

The present disclosure can also be realized in various aspects other than the liquid ejecting apparatus and the liquid ejecting head. For example, the present disclosure can be realized in aspects of a method for manufacturing a liquid ejecting head, a method for manufacturing a liquid ejecting apparatus, or the like.

The present disclosure is not limited to an ink jet method, and can be applied to any liquid ejecting apparatuses that ejects a liquid other than ink and a liquid ejecting head that is used in the liquid ejecting apparatuses. For example, the present disclosure can be applied to the following various liquid ejecting apparatuses and liquid ejecting heads thereof.

(1) An image recording apparatus such as a facsimile apparatus.

(2) A color material ejecting apparatus used for manufacturing a color filter for an image display apparatus such as a liquid crystal display.

(3) An electrode material ejecting apparatus used for forming electrodes of an organic Electro Luminescence (EL) display, a Field Emission Display (FED), or the like.

(4) A liquid ejecting apparatus that ejects a liquid containing a bioorganic substance used for manufacturing a biochip.

(5) A sample ejecting apparatus as a precision pipette.

(6) A lubricating oil ejecting apparatus.

(7) A resin liquid ejecting apparatus.

(8) A liquid ejecting apparatus that ejects lubricating oil with pinpoint to a precision machine such as a watch or a camera.

(9) A liquid ejecting apparatus that ejects a transparent resin liquid, such as an ultraviolet curable resin liquid, onto a substrate in order to form a micro hemispherical lens (optical lens) or the like used for an optical communication element or the like.

(10) A liquid ejecting apparatus that ejects an acidic or alkaline etching liquid for etching a substrate or the like.

(11) A liquid ejecting apparatus including a liquid consumption head that ejects any other minute amount of droplets.

Further, the "liquid" may be any material that can be consumed by the liquid ejecting apparatus. For example, the "liquid" may be a material in a state when a substance is liquefied, and the "liquid" includes a liquid state material with high or low viscosity and a liquid state material, such as a sol, gel water, other inorganic solvent, organic solvent, solution, liquid resin, and liquid metal (metal melt). Further, the "liquid" includes not only a liquid as a state of a substance but also a liquid in which particles of a functional material made of a solid substance, such as a pigment or a metal particle, are dissolved, dispersed, or mixed in a solvent. Further, the following is mentioned as a typical example of a liquid.

(1) Adhesive main agent and curing agent.

(2) Paint-based paints and diluents, clear paints and diluents.

(3) Main solvent and diluting solvent containing cells of ink for cells.

(4) Metallic leaf pigment dispersion liquid and diluting solvent of ink (metallic ink) that develops metallic luster.

(5) Gasoline/diesel and biofuel for vehicle fuel.

(6) Main ingredients and protective ingredients of medicine.

(7) Light Emitting Diode (LED) fluorescent material and encapsulant.

What is claimed is:

1. A liquid ejecting head comprising:

a piezoelectric element that includes a first drive electrode, a second drive electrode, and a piezoelectric body, the piezoelectric body being provided between the first drive electrode and the second drive electrode in a lamination direction in which the first drive electrode, the second drive electrode, and the piezoelectric body are laminated;

a vibration plate that is provided on one side of the lamination direction with respect to the piezoelectric element and is deformed by driving of the piezoelectric element;

a pressure chamber substrate that is provided on the one side of the lamination direction with respect to the vibration plate and is provided with a plurality of pressure chambers;

an interlayer that is laminated on at least one of the piezoelectric body, the vibration plate, or the pressure chamber substrate and of which resistance changes according to humidity;

a first detection electrode that is in contact with the interlayer; and a second detection electrode that is in contact with the interlayer and faces the first detection electrode.

2. The liquid ejecting head according to claim 1, wherein the first detection electrode and the second detection electrode are disposed on a surface of the interlayer, and a part of the surface of the interlayer is exposed between the first detection electrode and the second detection electrode.

3. The liquid ejecting head according to claim 1, wherein the interlayer includes a first interlayer and a second interlayer laminated on the first interlayer, and a boundary surface between the first interlayer and the second interlayer is disposed between the first detection electrode and the second detection electrode.

4. A liquid ejecting apparatus comprising:

the liquid ejecting head according to claim 1;

a resistance measurement section that measures resistance between the first detection electrode and the second detection electrode; and a humidity management section that acquires information on humidity of the interlayer by using the resistance which is measured by the resistance measurement section.

5. The liquid ejecting head according to claim 1, wherein at least one of the first detection electrode and the second detection electrode is formed of the same material as a material of the first drive electrode.

6. The liquid ejecting head according to claim 1, wherein at least one of the first detection electrode and the second detection electrode is formed of the same material as a material of the second drive electrode.

7. The liquid ejecting head according to claim 1, further comprising:

a protective film that is disposed at a position on another side of the lamination direction with respect to the pressure chamber substrate and contains a resin material, the other side of the lamination direction being a side of the lamination direction opposite to the one side on which the vibration plate is provided, wherein the interlayer is formed of the same material as a material of the protective film.

8. The liquid ejecting head according to claim 7, wherein the first detection electrode and the second detection electrode are disposed in the same layer on one side of the lamination direction or the other side of the lamination direction with respect to the interlayer.

9. The liquid ejecting head according to claim 7, wherein the first detection electrode is disposed on the one side of the lamination direction with respect to the interlayer, and the second detection electrode is disposed on the other side of the lamination direction with respect to the interlayer.

10. The liquid ejecting head according to claim 7, wherein in plan view of the liquid ejecting head in the lamination direction, the protective film is disposed at a drive electrode end portion position overlapping an end portion of the first drive electrode or an end portion of the second drive electrode, and the first detection electrode and the second detection electrode are disposed in the same layer on the one side of the lamination direction or the other side of the lamination direction with respect to the protective film that is disposed at the drive electrode end portion position and serves as the interlayer.

11. The liquid ejecting head according to claim 1, wherein the interlayer is formed of the same material as a material of the piezoelectric body.

12. The liquid ejecting head according to claim 11, wherein the first detection electrode and the second detection electrode are disposed in the same layer on one side of the lamination direction or the other of the lamination direction with respect to the interlayer.

13. The liquid ejecting head according to claim 11, wherein the first detection electrode is disposed on one side of the lamination direction with respect to the interlayer, and the second detection electrode is disposed on the other side of the lamination direction with respect to the interlayer.

14. The liquid ejecting head according to claim 1, wherein the interlayer is formed of the same material as a material of the vibration plate.

15. The liquid ejecting head according to claim 14, wherein the first detection electrode and the second detection electrode are disposed in the same layer on the one side of the lamination direction or the other side of the lamination direction with respect to the interlayer.

16. The liquid ejecting head according to claim 15, wherein the vibration plate includes a first layer and a second layer laminated on the first layer, and a boundary surface between the first layer and the second layer is disposed between the first detection electrode and the second detection electrode.

17. The liquid ejecting head according to claim 1, wherein in plan view of the liquid ejecting head in the lamination direction, the plurality of pressure chambers are arranged in a first pressure chamber row along a first arrangement direction and in a second pressure chamber row along a second arrangement direction parallel to the first arrangement direction, and the interlayer, the first detection electrode, and the second detection electrode are disposed at at least one position of positions adjacent to the first pressure chamber row along the first arrangement direction and positions adjacent to the second pressure chamber row along the second arrangement direction.

18. The liquid ejecting head according to claim 1, wherein in plan view of the liquid ejecting head in the lamination direction, the plurality of pressure chambers are arranged in a first pressure chamber row along a first arrangement direction and in a second pressure chamber row along a second arrangement direction parallel to the first arrangement direction, a wiring substrate that is electrically coupled to the liquid ejecting head is disposed between the first pressure chamber row and the second pressure chamber row, and the interlayer, the first detection electrode, and the second detection electrode are disposed at positions adjacent to the wiring substrate along the first arrangement direction.

* * * * *